(12) United States Patent
Devereaux et al.

(10) Patent No.: US 12,100,050 B1
(45) Date of Patent: Sep. 24, 2024

(54) ELECTRONIC SENSOR MANAGEMENT

(71) Applicant: United Services Automobile Association (USAA), San Antonio, TX (US)

(72) Inventors: Ramsey Devereaux, San Antonio, TX (US); Michael J. Allen, San Antonio, TX (US); Spencer Read, Helotes, TX (US); Traci K. Uribe, San Antonio, TX (US); Ina L Jackson, Schertz, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 666 days.

(21) Appl. No.: 17/388,922

(22) Filed: Jul. 29, 2021

Related U.S. Application Data

(63) Continuation-in-part of application No. 15/887,776, filed on Feb. 2, 2018, now Pat. No. 11,087,404, which is a continuation-in-part of application No. 15/652,053, filed on Jul. 17, 2017, now Pat. No. 10,121,207, which is a continuation of application No. 14/251,404, filed on Apr. 11, 2014, now Pat. No. 9,710,858.

(60) Provisional application No. 61/948,192, filed on Mar. 5, 2014, provisional application No. 61/943,897, filed on Feb. 24, 2014, provisional application No.
(Continued)

(51) Int. Cl.
| | |
|---|---|
| *G06Q 40/08* | (2012.01) |
| *G06Q 10/20* | (2023.01) |
| *G06Q 40/03* | (2023.01) |
| *G06Q 40/12* | (2023.01) |
| *G06Q 50/16* | (2012.01) |
| *G06V 20/10* | (2022.01) |

(52) U.S. Cl.
CPC ............ *G06Q 40/08* (2013.01); *G06Q 10/20* (2013.01); *G06Q 40/03* (2023.01); *G06Q 40/12* (2013.12); *G06Q 50/16* (2013.01); *G06V 20/176* (2022.01); *G06F 2218/12* (2023.01); *G06Q 2220/00* (2013.01)

(58) Field of Classification Search
CPC .................................................... G06Q 40/08
See application file for complete search history.

(56) References Cited

U.S. PATENT DOCUMENTS

| | | | |
|---|---|---|---|
| 5,182,705 A | 1/1993 | Barr et al. | |
| 5,235,507 A | 8/1993 | Sackler et al. | |
| | (Continued) | | |

FOREIGN PATENT DOCUMENTS

| | | | |
|---|---|---|---|
| AT | 503861 B1 | 6/2008 | |
| CA | 2478911 A1 | 9/2003 | |
| | (Continued) | | |

OTHER PUBLICATIONS

T. Sanidas et al., U.S. Appl. No. 61/800,561, filed Mar. 15, 2013, Specification, 29 pages.
(Continued)

*Primary Examiner* — Edward Chang
(74) *Attorney, Agent, or Firm* — Fletcher Yoder, P.C.

(57) ABSTRACT

Systems and techniques are provided for providing notification indicative of a breach of a dynamic operational parameter threshold. The dynamic operational parameter threshold is set based upon habits of inhabitants of an environment, which are observed via controlled sensors of the environment.

20 Claims, 6 Drawing Sheets

Related U.S. Application Data

61/943,901, filed on Feb. 24, 2014, provisional application No. 61/943,906, filed on Feb. 24, 2014, provisional application No. 61/926,532, filed on Jan. 13, 2014, provisional application No. 61/926,536, filed on Jan. 13, 2014, provisional application No. 61/926,541, filed on Jan. 13, 2014, provisional application No. 61/926,534, filed on Jan. 13, 2014, provisional application No. 61/926,121, filed on Jan. 10, 2014, provisional application No. 61/926,111, filed on Jan. 10, 2014, provisional application No. 61/926,103, filed on Jan. 10, 2014, provisional application No. 61/926,095, filed on Jan. 10, 2014, provisional application No. 61/926,091, filed on Jan. 10, 2014, provisional application No. 61/926,108, filed on Jan. 10, 2014, provisional application No. 61/926,123, filed on Jan. 10, 2014, provisional application No. 61/926,098, filed on Jan. 10, 2014, provisional application No. 61/926,118, filed on Jan. 10, 2014, provisional application No. 61/926,119, filed on Jan. 10, 2014, provisional application No. 61/926,114, filed on Jan. 10, 2014.

(56) References Cited

U.S. PATENT DOCUMENTS

| | | |
|---|---|---|
| 5,325,291 A | 6/1994 | Garrett et al. |
| 5,526,609 A | 6/1996 | Lee et al. |
| 5,724,261 A | 3/1998 | Denny et al. |
| 5,950,169 A | 9/1999 | Borghesi et al. |
| 5,960,338 A | 9/1999 | Foti |
| 5,991,733 A | 11/1999 | Aleia et al. |
| 6,029,141 A | 2/2000 | Bezos et al. |
| 6,049,773 A | 4/2000 | McCormack et al. |
| 6,141,686 A | 10/2000 | Jackowski et al. |
| 6,526,807 B1 | 3/2003 | Doumit et al. |
| 6,686,838 B1 | 2/2004 | Rezvani et al. |
| 6,766,322 B1 | 7/2004 | Bell |
| 6,826,607 B1 | 11/2004 | Gelvin et al. |
| 6,985,907 B2 | 1/2006 | Zambo et al. |
| 7,015,789 B1 | 3/2006 | Helgeson |
| 7,138,914 B2 | 11/2006 | Culpepper et al. |
| 7,142,099 B2 | 11/2006 | Ross et al. |
| 7,170,418 B2 | 1/2007 | Rose-Pehrsson et al. |
| 7,203,654 B2 | 4/2007 | Menendez |
| 7,398,218 B1 | 7/2008 | Bernaski et al. |
| 7,406,436 B1 | 7/2008 | Reisman |
| 7,602,196 B2 | 10/2009 | Vokey |
| 7,610,210 B2 | 10/2009 | Helitzer et al. |
| 7,624,031 B2 | 11/2009 | Simpson et al. |
| 7,624,069 B2 | 11/2009 | Padgette |
| 7,711,584 B2 | 5/2010 | Helitzer et al. |
| 7,716,076 B1 | 5/2010 | Block et al. |
| 7,739,133 B1 | 6/2010 | Hail et al. |
| 7,809,587 B2 | 10/2010 | Dorai et al. |
| 7,869,944 B2 | 1/2011 | Deaton et al. |
| 7,885,831 B2 | 2/2011 | Burton et al. |
| 7,899,560 B2 | 3/2011 | Eck |
| 7,937,437 B2 | 5/2011 | Fujii |
| 7,945,497 B2 | 5/2011 | Kenefick et al. |
| 7,949,548 B2 | 5/2011 | Mathai et al. |
| 7,958,184 B2 | 6/2011 | Barsness et al. |
| 7,969,296 B1 | 6/2011 | Stell |
| 8,004,404 B2 | 8/2011 | Izumi et al. |
| 8,041,636 B1 | 10/2011 | Hunter et al. |
| 8,046,243 B2 | 10/2011 | Winkler |
| 8,069,181 B1 | 11/2011 | Krishnan et al. |
| 8,081,795 B2 | 12/2011 | Brown |
| 8,086,523 B1 | 12/2011 | Palmer |
| 8,090,598 B2 | 1/2012 | Bauer et al. |
| 8,095,394 B2 | 1/2012 | Nowak et al. |
| 8,103,527 B1 | 1/2012 | Lasalle et al. |
| 8,106,769 B1 * | 1/2012 | Maroney .............. G06Q 10/10 340/540 |
| 8,229,767 B2 | 7/2012 | Birchall |
| 8,249,968 B1 | 8/2012 | Oldham et al. |
| 8,265,963 B1 | 9/2012 | Hanson et al. |
| 8,271,303 B2 | 9/2012 | Helitzer et al. |
| 8,271,308 B2 | 9/2012 | Winkler |
| 8,271,321 B1 | 9/2012 | Kestenbaum |
| 8,289,160 B1 | 10/2012 | Billman |
| 8,294,567 B1 | 10/2012 | Stell |
| 8,306,258 B2 | 11/2012 | Brown |
| 8,332,242 B1 | 12/2012 | Medina, III |
| 8,332,348 B1 | 12/2012 | Avery |
| 8,384,538 B2 | 2/2013 | Breed |
| 8,400,299 B1 | 3/2013 | Maroney et al. |
| 8,428,972 B1 | 4/2013 | Noles et al. |
| 8,452,678 B2 | 5/2013 | Feldman et al. |
| 8,510,196 B1 | 8/2013 | Brandmaier et al. |
| 8,515,788 B2 | 8/2013 | Tracy et al. |
| 8,521,542 B1 | 8/2013 | Stotts |
| 8,527,306 B1 | 9/2013 | Reeser et al. |
| 8,600,104 B2 | 12/2013 | Brown |
| 8,635,091 B2 * | 1/2014 | Amigo .................. G06Q 40/08 705/35 |
| 8,638,228 B2 | 1/2014 | Amigo et al. |
| 8,650,048 B1 | 2/2014 | Hopkins, III et al. |
| 8,676,612 B2 | 3/2014 | Helitzer et al. |
| 8,719,061 B2 | 5/2014 | Birchall |
| 8,731,975 B2 | 5/2014 | English et al. |
| 8,760,285 B2 | 6/2014 | Billman et al. |
| 8,774,525 B2 | 7/2014 | Pershing |
| 8,782,395 B1 | 7/2014 | Ly |
| 8,788,299 B1 | 7/2014 | Medina, III |
| 8,788,301 B1 | 7/2014 | Marlow et al. |
| 8,799,034 B1 | 8/2014 | Brandmaier et al. |
| 8,812,414 B2 | 8/2014 | Arthur et al. |
| 8,813,065 B2 | 8/2014 | Zygmuntowicz et al. |
| 8,868,541 B2 | 10/2014 | Lin et al. |
| 8,872,818 B2 | 10/2014 | Freeman et al. |
| 8,910,298 B2 | 12/2014 | Gettings et al. |
| 8,924,241 B2 | 12/2014 | Grosso |
| 8,930,581 B2 | 1/2015 | Anton et al. |
| 9,015,238 B1 | 4/2015 | Anton et al. |
| 9,049,168 B2 | 6/2015 | Jacob et al. |
| 9,053,516 B2 | 6/2015 | Stempora |
| 9,082,015 B2 | 7/2015 | Christopulos et al. |
| 9,141,995 B1 | 9/2015 | Brinkmann et al. |
| 9,158,869 B2 | 10/2015 | Labrie et al. |
| 9,165,084 B2 | 10/2015 | Isberg et al. |
| 9,183,560 B2 | 11/2015 | Abelow |
| 9,252,980 B2 | 2/2016 | Raman |
| 9,311,676 B2 | 4/2016 | Helitzer et al. |
| 9,330,550 B2 | 5/2016 | Zribi et al. |
| 9,363,322 B1 | 6/2016 | Anton et al. |
| 9,454,907 B2 | 9/2016 | Hafeez et al. |
| 9,460,471 B2 | 10/2016 | Bernard et al. |
| 9,481,459 B2 | 11/2016 | Staskevich et al. |
| 9,611,038 B2 | 4/2017 | Dahlstrom |
| 9,613,523 B2 | 4/2017 | Davidson et al. |
| 9,652,805 B1 | 5/2017 | Clawson, II et al. |
| 9,665,074 B2 | 5/2017 | Lentzitzky |
| 9,710,858 B1 | 7/2017 | Devereaux et al. |
| 9,747,571 B2 | 8/2017 | Ballew et al. |
| 9,754,325 B1 | 9/2017 | Konrardy et al. |
| 9,792,656 B1 | 10/2017 | Konrardy et al. |
| 9,811,862 B1 | 11/2017 | Allen et al. |
| 9,818,158 B1 | 11/2017 | Devereaux et al. |
| 9,842,310 B2 | 12/2017 | Lekas |
| 9,886,723 B1 | 2/2018 | Devereaux et al. |
| 9,892,463 B1 | 2/2018 | Hakimi-Boushehri et al. |
| 9,934,675 B2 | 4/2018 | Coyne et al. |
| 9,947,051 B1 | 4/2018 | Allen et al. |
| 9,959,581 B2 | 5/2018 | Pershing |
| 9,984,417 B1 | 5/2018 | Allen et al. |
| 10,032,224 B2 | 7/2018 | Helitzer et al. |
| 10,055,793 B1 | 8/2018 | Call et al. |
| 10,055,794 B1 | 8/2018 | Konrardy et al. |
| 10,121,207 B1 | 11/2018 | Devereaux et al. |
| 10,163,162 B1 | 12/2018 | Devereaux et al. |

(56) References Cited

U.S. PATENT DOCUMENTS

| | | |
|---|---|---|
| 10,181,159 B1 | 1/2019 | Allen et al. |
| 2002/0007289 A1 | 1/2002 | Malin et al. |
| 2002/0032586 A1 | 3/2002 | Joao |
| 2002/0035528 A1 | 3/2002 | Simpson et al. |
| 2002/0049618 A1 | 4/2002 | McClure et al. |
| 2002/0055861 A1 | 5/2002 | King et al. |
| 2002/0087364 A1 | 7/2002 | Lerner et al. |
| 2002/0103622 A1 | 8/2002 | Burge |
| 2002/0111835 A1 | 8/2002 | Hele et al. |
| 2002/0116254 A1 | 8/2002 | Stein et al. |
| 2002/0129001 A1 | 9/2002 | Levkoff et al. |
| 2002/0178033 A1 | 11/2002 | Yoshioka et al. |
| 2003/0040934 A1 | 2/2003 | Skidmore et al. |
| 2003/0078816 A1 | 4/2003 | Filep |
| 2003/0097335 A1 | 5/2003 | Moskowitz et al. |
| 2003/0182441 A1 | 9/2003 | Andrew et al. |
| 2004/0019507 A1 | 1/2004 | Yaruss et al. |
| 2004/0034657 A1 | 2/2004 | Zambo et al. |
| 2004/0039586 A1 | 2/2004 | Garvey et al. |
| 2004/0046033 A1 | 3/2004 | Kolodziej et al. |
| 2004/0064345 A1 | 4/2004 | Ajamian et al. |
| 2004/0172304 A1 | 9/2004 | Joao |
| 2004/0181621 A1 | 9/2004 | Mathur et al. |
| 2004/0260406 A1 | 12/2004 | Ljunggren et al. |
| 2005/0050017 A1 | 3/2005 | Ross et al. |
| 2005/0055248 A1 | 3/2005 | Helitzer et al. |
| 2005/0055249 A1 | 3/2005 | Helitzer et al. |
| 2005/0057365 A1 | 3/2005 | Qualey |
| 2005/0128074 A1 | 6/2005 | Culpepper et al. |
| 2005/0197847 A1 | 9/2005 | Smith |
| 2005/0226273 A1 | 10/2005 | Qian |
| 2005/0251427 A1 | 11/2005 | Dorai et al. |
| 2005/0278082 A1 | 12/2005 | Weekes |
| 2006/0017558 A1 | 1/2006 | Albert et al. |
| 2006/0026044 A1 | 2/2006 | Smith |
| 2006/0052905 A1 | 3/2006 | Pfingsten et al. |
| 2006/0111874 A1 | 5/2006 | Curtis et al. |
| 2006/0200008 A1 | 9/2006 | Moore-Ede |
| 2006/0218018 A1 | 9/2006 | Schmitt |
| 2006/0219705 A1 | 10/2006 | Beier et al. |
| 2006/0229923 A1 | 10/2006 | Adi et al. |
| 2006/0235611 A1 | 10/2006 | Deaton et al. |
| 2007/0005400 A1 | 1/2007 | Eggenberger et al. |
| 2007/0005404 A1 | 1/2007 | Raz et al. |
| 2007/0043803 A1 | 2/2007 | Whitehouse et al. |
| 2007/0088579 A1 | 4/2007 | Richards |
| 2007/0100669 A1 | 5/2007 | Wargin et al. |
| 2007/0118399 A1 | 5/2007 | Avinash et al. |
| 2007/0136078 A1 | 6/2007 | Plante |
| 2007/0150319 A1 | 6/2007 | Menendez |
| 2007/0156463 A1 | 7/2007 | Burton et al. |
| 2007/0161940 A1 | 7/2007 | Blanchard et al. |
| 2007/0174467 A1 * | 7/2007 | Ballou, Jr. .......... H04L 63/0838 709/227 |
| 2007/0214023 A1 | 9/2007 | Mathai et al. |
| 2007/0282639 A1 | 12/2007 | Leszuk et al. |
| 2007/0299677 A1 | 12/2007 | Maertz |
| 2008/0033847 A1 | 2/2008 | McIntosh |
| 2008/0052134 A1 | 2/2008 | Nowak et al. |
| 2008/0065427 A1 | 3/2008 | Helitzer et al. |
| 2008/0077451 A1 | 3/2008 | Anthony et al. |
| 2008/0086320 A1 | 4/2008 | Ballew et al. |
| 2008/0114655 A1 | 5/2008 | Skidmore |
| 2008/0140857 A1 | 6/2008 | Conner et al. |
| 2008/0154651 A1 | 6/2008 | Kenefick et al. |
| 2008/0154686 A1 | 6/2008 | Vicino |
| 2008/0154851 A1 | 6/2008 | Jean |
| 2008/0154886 A1 | 6/2008 | Podowski et al. |
| 2008/0164769 A1 | 7/2008 | Eck |
| 2008/0243558 A1 | 10/2008 | Gupte |
| 2008/0244329 A1 | 10/2008 | Shinbo et al. |
| 2008/0282817 A1 | 11/2008 | Breed |
| 2008/0306799 A1 | 12/2008 | Sopko, III et al. |
| 2008/0307104 A1 | 12/2008 | Amini et al. |
| 2008/0319787 A1 | 12/2008 | Stivoric et al. |
| 2009/0006175 A1 | 1/2009 | Maertz |
| 2009/0024420 A1 | 1/2009 | Winkler |
| 2009/0031175 A1 | 1/2009 | Aggarwal et al. |
| 2009/0109037 A1 | 4/2009 | Farmer |
| 2009/0119132 A1 | 5/2009 | Bolano et al. |
| 2009/0135009 A1 | 5/2009 | Little et al. |
| 2009/0177500 A1 | 7/2009 | Swahn |
| 2009/0188202 A1 | 7/2009 | Vokey |
| 2009/0205054 A1 | 8/2009 | Blotenberg et al. |
| 2009/0216349 A1 | 8/2009 | Kwon et al. |
| 2009/0240531 A1 | 9/2009 | Hilborn |
| 2009/0240550 A1 | 9/2009 | McCarty |
| 2009/0265193 A1 | 10/2009 | Collins et al. |
| 2009/0265207 A1 | 10/2009 | Johnson |
| 2009/0266565 A1 | 10/2009 | Char |
| 2009/0279734 A1 | 11/2009 | Brown |
| 2009/0287509 A1 | 11/2009 | Basak et al. |
| 2010/0030586 A1 | 2/2010 | Taylor et al. |
| 2010/0049552 A1 | 2/2010 | Fini et al. |
| 2010/0131300 A1 | 5/2010 | Collopy et al. |
| 2010/0131307 A1 | 5/2010 | Collopy et al. |
| 2010/0174566 A1 | 7/2010 | Helitzer et al. |
| 2010/0241464 A1 | 9/2010 | Amigo et al. |
| 2010/0274590 A1 | 10/2010 | Compangano et al. |
| 2010/0274859 A1 | 10/2010 | Bucuk |
| 2010/0299161 A1 | 11/2010 | Burdick et al. |
| 2010/0299162 A1 | 11/2010 | Kwan |
| 2011/0043958 A1 | 2/2011 | Nakamura et al. |
| 2011/0061697 A1 | 3/2011 | Behrenbruch et al. |
| 2011/0112848 A1 | 5/2011 | Beraja et al. |
| 2011/0137684 A1 | 6/2011 | Peak et al. |
| 2011/0137685 A1 | 6/2011 | Tracy et al. |
| 2011/0137885 A1 | 6/2011 | Isberg et al. |
| 2011/0161117 A1 | 6/2011 | Busque et al. |
| 2011/0161119 A1 | 6/2011 | Collins |
| 2011/0295624 A1 | 12/2011 | Chapin et al. |
| 2011/0320226 A1 | 12/2011 | Graziano et al. |
| 2012/0004935 A1 | 1/2012 | Winkler |
| 2012/0016695 A1 | 1/2012 | Bernard et al. |
| 2012/0022897 A1 | 1/2012 | Shafer |
| 2012/0025994 A1 | 2/2012 | Morris |
| 2012/0028635 A1 | 2/2012 | Borg et al. |
| 2012/0028835 A1 | 2/2012 | Wild et al. |
| 2012/0046975 A1 | 2/2012 | Stolze |
| 2012/0072240 A1 | 3/2012 | Grosso et al. |
| 2012/0096149 A1 | 4/2012 | Sunkara et al. |
| 2012/0101855 A1 | 4/2012 | Collins et al. |
| 2012/0116820 A1 | 5/2012 | English et al. |
| 2012/0130751 A1 | 5/2012 | McHugh et al. |
| 2012/0143634 A1 | 6/2012 | Beyda et al. |
| 2012/0158436 A1 | 6/2012 | Bauer et al. |
| 2012/0176237 A1 | 7/2012 | Tabe |
| 2012/0215568 A1 | 8/2012 | Vahidi et al. |
| 2012/0290333 A1 | 11/2012 | Birchall |
| 2012/0311053 A1 | 12/2012 | Labrie et al. |
| 2012/0311614 A1 | 12/2012 | DeAnna et al. |
| 2012/0323609 A1 | 12/2012 | Fini |
| 2013/0006608 A1 | 1/2013 | Dehors et al. |
| 2013/0018936 A1 | 1/2013 | DAmico et al. |
| 2013/0040636 A1 | 2/2013 | Borg et al. |
| 2013/0040836 A1 | 2/2013 | Himmler et al. |
| 2013/0055060 A1 | 2/2013 | Folsom et al. |
| 2013/0060583 A1 | 3/2013 | Collins et al. |
| 2013/0073303 A1 | 3/2013 | Hsu |
| 2013/0144658 A1 | 6/2013 | Schnabolk et al. |
| 2013/0144858 A1 | 6/2013 | Lin et al. |
| 2013/0182002 A1 | 7/2013 | Macciola et al. |
| 2013/0185716 A1 | 7/2013 | Yin et al. |
| 2013/0197945 A1 | 8/2013 | Anderson |
| 2013/0201018 A1 | 8/2013 | Horstemeyer et al. |
| 2013/0226623 A1 | 8/2013 | Diana et al. |
| 2013/0226624 A1 | 8/2013 | Blessman et al. |
| 2013/0245796 A1 | 9/2013 | Lentzitzky et al. |
| 2013/0253961 A1 | 9/2013 | Feldman et al. |
| 2013/0268358 A1 | 10/2013 | Haas |
| 2013/0282408 A1 | 10/2013 | Snyder et al. |
| 2013/0317732 A1 | 11/2013 | Borg et al. |
| 2014/0040343 A1 | 2/2014 | Nickolov et al. |
| 2014/0046701 A1 | 2/2014 | Steinberg et al. |

(56) References Cited

U.S. PATENT DOCUMENTS

| | | |
|---|---|---|
| 2014/0050147 A1 | 2/2014 | Beale |
| 2014/0058761 A1 | 2/2014 | Freiberger et al. |
| 2014/0067137 A1 | 3/2014 | Amelio et al. |
| 2014/0081675 A1 | 3/2014 | Ives et al. |
| 2014/0089156 A1 | 3/2014 | Williams et al. |
| 2014/0089990 A1 | 3/2014 | van Deventer et al. |
| 2014/0108275 A1 | 4/2014 | Heptonstall |
| 2014/0114693 A1 | 4/2014 | Helitzer et al. |
| 2014/0114893 A1 | 4/2014 | Arthur et al. |
| 2014/0123292 A1 | 5/2014 | Schmidt et al. |
| 2014/0123309 A1 | 5/2014 | Jung et al. |
| 2014/0132409 A1 | 5/2014 | Billman et al. |
| 2014/0136242 A1* | 5/2014 | Weekes ............... G06Q 40/08 705/4 |
| 2014/0142989 A1 | 5/2014 | Grosso |
| 2014/0149485 A1 | 5/2014 | Sharma et al. |
| 2014/0180723 A1 | 6/2014 | Cote et al. |
| 2014/0192646 A1 | 7/2014 | Mir et al. |
| 2014/0195272 A1 | 7/2014 | Sadiq et al. |
| 2014/0201072 A1 | 7/2014 | Reeser et al. |
| 2014/0201315 A1 | 7/2014 | Jacob et al. |
| 2014/0214458 A1 | 7/2014 | Vahidi et al. |
| 2014/0257862 A1 | 9/2014 | Billman et al. |
| 2014/0257863 A1 | 9/2014 | Maastricht et al. |
| 2014/0266669 A1 | 9/2014 | Fadell et al. |
| 2014/0270492 A1 | 9/2014 | Christopulos et al. |
| 2014/0278573 A1 | 9/2014 | Cook |
| 2014/0279593 A1 | 9/2014 | Pershing |
| 2014/0280457 A1 | 9/2014 | Anton et al. |
| 2014/0304007 A1 | 10/2014 | Kimball et al. |
| 2014/0316614 A1 | 10/2014 | Newman |
| 2014/0322676 A1 | 10/2014 | Raman |
| 2014/0327995 A1 | 11/2014 | Panjwani et al. |
| 2014/0334492 A1 | 11/2014 | Mack-Crane |
| 2014/0358592 A1 | 12/2014 | Wedig et al. |
| 2014/0371941 A1 | 12/2014 | Keller et al. |
| 2014/0375440 A1 | 12/2014 | Rezvani et al. |
| 2014/0380264 A1 | 12/2014 | Misra et al. |
| 2015/0006206 A1 | 1/2015 | Mdeway |
| 2015/0019266 A1 | 1/2015 | Stempora |
| 2015/0025915 A1 | 1/2015 | Lekas |
| 2015/0025917 A1 | 1/2015 | Stempora |
| 2015/0026074 A1 | 1/2015 | Cotten |
| 2015/0112504 A1 | 4/2015 | Binion et al. |
| 2015/0154709 A1 | 6/2015 | Cook |
| 2015/0154712 A1 | 6/2015 | Cook |
| 2015/0161738 A1 | 6/2015 | Stempora |
| 2015/0221051 A1 | 8/2015 | Settino |
| 2015/0332407 A1 | 11/2015 | Wilson et al. |
| 2015/0339911 A1 | 11/2015 | Coyne et al. |
| 2015/0370272 A1 | 12/2015 | Reddy et al. |
| 2015/0372832 A1 | 12/2015 | Kortz et al. |
| 2016/0005130 A1 | 1/2016 | Devereaux et al. |
| 2016/0039921 A1 | 2/2016 | Luo et al. |
| 2016/0055594 A1 | 2/2016 | Emison |
| 2016/0067547 A1 | 3/2016 | Anthony et al. |
| 2016/0104250 A1 | 4/2016 | Allen et al. |
| 2016/0125170 A1 | 5/2016 | Abramowitz |
| 2016/0163186 A1 | 6/2016 | Davidson et al. |
| 2016/0225098 A1 | 8/2016 | Helitzer et al. |
| 2017/0178424 A1 | 6/2017 | Wright |
| 2017/0365008 A1 | 12/2017 | Schreier et al. |

FOREIGN PATENT DOCUMENTS

| | | |
|---|---|---|
| CA | 2518482 C | 3/2007 |
| CA | 2805226 A1 | 8/2013 |
| CA | 2882086 A1 | 2/2014 |
| CN | 103203054 B | 7/2013 |
| DE | 102005015028 B4 | 10/2006 |
| DE | 102008008317 A1 | 8/2009 |
| EP | 722145 A1 | 7/1996 |
| EP | 1790057 B1 | 5/2012 |
| EP | 2795757 A4 | 10/2014 |
| EP | 2276135 B1 | 4/2015 |
| EP | 3255613 A1 | 12/2017 |
| GB | 2449510 A | 11/2008 |
| JP | 3282937 B2 | 5/2002 |
| JP | 2002358425 A | 12/2002 |
| JP | 2008250594 A | 10/2008 |
| KR | 20090090461 A | 8/2009 |
| MX | 337513 B | 8/2009 |
| RU | 2015109725 A | 10/2016 |
| WO | 2004034232 A2 | 4/2004 |
| WO | 2006074682 A2 | 7/2006 |
| WO | 2010136163 A1 | 12/2010 |
| WO | 2012075442 A1 | 6/2012 |
| WO | 2013/036677 A1 | 3/2013 |

OTHER PUBLICATIONS

Telematics Set the Stage the Improved Auto Claims Management by Sam Friedman (Oct. 10, 2012); 3 pages.
U.S. Appl. No. 14/862,776, Devereaux et al., filed Sep. 23, 2015.
U.S. Appl. No. 14/251,392, Allen et al., filed Apr. 11, 2014.
U.S. Appl. No. 14/251,377, Devereaux et al., filed Apr. 11, 2014.
U.S. Appl. No. 14/251,404, Devereaux et al., filed Apr. 11, 2014.
U.S. Appl. No. 14/251,411, Allen et al., filed Apr. 11, 2014.
U.S. Appl. No. 14/273,877, Allen et al., filed May 9, 2014.
U.S. Appl. No. 14/273,889, Devereaux et al., filed May 9, 2014.
U.S. Appl. No. 14/273,918, Allen et al., filed May 9, 2014.
U.S. Appl. No. 14/278,182, Allen et al., filed May 15, 2014.
U.S. Appl. No. 14/278,202, Allen et al., filed May 15, 2014.
U.S. Appl. No. 14/303,336, Devereaux et al., filed Jun. 12, 2014.
U.S. Appl. No. 14/303,347, Devereaux et al., filed Jun. 12, 2014.
U.S. Appl. No. 14/303,370, Allen et al., filed Jun. 12, 2014.
U.S. Appl. No. 14/303,382, Allen et al., filed Jun. 12, 2014.
U.S. Appl. No. 14/324,534, Devereaux et al., filed Jul. 7, 2014.
U.S. Appl. No. 14/324,546, Devereaux et al., filed Jul. 7, 2014.
U.S. Appl. No. 14/324,609, Devereaux et al., filed Jul. 7, 2014.
U.S. Appl. No. 14/324,618, Devereaux et al., filed Jul. 7, 2014.
U.S. Appl. No. 14/324,748, Devereaux et al., filed Jul. 7, 2014.
U.S. Appl. No. 14/324,759, Devereaux et al., filed Jul. 7, 2014.
U.S. Appl. No. 15/244,847, Devereaux et al., filed Aug. 23, 2016.
U.S. Appl. No. 61/800,561, Sanidas et al., filed Mar. 15, 2013.
U.S. Appl. No. 61/866,779, Bergner, filed Aug. 16, 2013.
U.S. Appl. No. 61/926,091, Allen et al., filed Jan. 10, 2014.
U.S. Appl. No. 61/926,093, Allen et al., filed Jan. 10, 2014.
U.S. Appl. No. 61/926,095, Allen et al., filed Jan. 10, 2014.
U.S. Appl. No. 61/926,098, Allen et al., filed Jan. 10, 2014.
U.S. Appl. No. 61/926,103, Devereaux et al., filed Jan. 10, 2014.
U.S. Appl. No. 61/926,108, Allen et al., filed Jan. 10, 2014.
U.S. Appl. No. 61/926,111, Allen et al., filed Jan. 10, 2014.
U.S. Appl. No. 61/926,114, Devereaux et al., filed Jan. 10, 2014.
U.S. Appl. No. 61/926,118, Devereaux et al., filed Jan. 10, 2014.
U.S. Appl. No. 61/926,119, Devereaux et al., filed Jan. 10, 2014.
U.S. Appl. No. 61/926,121, Devereaux et al., filed Jan. 10, 2014.
U.S. Appl. No. 61/926,123, Devereaux et al., filed Jan. 10, 2014.
U.S. Appl. No. 61/926,532, Allen et al., filed Jan. 13, 2014.
U.S. Appl. No. 61/926,534, Allen et al., filed Jan. 13, 2014.
U.S. Appl. No. 61/926,536, Allen et al., filed Jan. 13, 2014.
U.S. Appl. No. 61/926,541, Allen et al., filed Jan. 13, 2014.
U.S. Appl. No. 61/943,897, Devereaux et al., filed Feb. 24, 2014.
U.S. Appl. No. 61/943,901, Devereaux et al., filed Feb. 24, 2014.
U.S. Appl. No. 61/943,906, Devereaux et al., filed Feb. 24, 2014.
U.S. Appl. No. 61/948,192, Davis et al., filed Mar. 5, 2014.
U.S. Appl. No. 62/311,491, Moy, filed Mar. 22, 2016.
U.S. Appl. No. 62/325,250, Rodgers et al., filed Apr. 20, 2016.
U.S. Appl. No. 62/351,427, Devereaux et al., filed Jun. 17, 2016.
U.S. Appl. No. 62/351,441, Flachsbart et al., filed Jun. 17, 2016.
U.S. Appl. No. 62/351,451, Chavez et al., filed Jun. 17, 2016.
"After an Auto Accident: Understanding the Claims Process," Financial Services Commission on Ontario, 2011, 10 pgs.
"Truck Crash Event Data Recorder Downloading," Crash Forensic; 2012, pp. 1-25.

(56) References Cited

OTHER PUBLICATIONS

Aiyagari, Sanjay et al., "AMQP Message Queuing Protocol Specification," Version Dec. 9, 2006. https://www.rabbitmq.com/resources/specs/amqp0-9.
Amanda Love, "How Recoverable Depreciation Works", Aug. 6, 2012, http://www.stateroofingtexas.com/recoverable-depreciation-works/.
AMQP is the Internet Protocol for Business Messaging Website. Jul. 4, 2011. https://web.archive.org/web/20110704212632/http://www.amqp.org/about/what.
Cloudera.com, "Migrating from MapReduce 1 (MRv1) to Map Reduce 2 (MRv2, YARN)", https://www.cloudera.com/documentation/enterprise/5-9-x/topics/cdh_ig_mapreduce_to_yarn_migrate.html, page generated Feb. 6, 2018.
Corbett et al., "Spanner: Google's Globally-Distributed Database," Google, Inc., pp. 1-14, 2012.
Das, Sudipto et al., "Ricardo: Integrating R and Hadoop," IBM Almaden Research Center, SIGMOD'10, Jun. 6-11, 2010.
Dean et al., "A New Age of Data Mining in the High-Performance World," SAS Institute Inc., 2012.
Deerwester et al., "Indexing by Latent Semantic Analysis," Journal of the American Society for Information Science, 1990.41 (6), pp. 391-407.
Farmers Next Generation Homeowners Policy, Missouri, by Farmers insurance Exchange; 2008; 50 pages.
Fong et al., "Toward a scale-out data-management middleware for low-latency enterprise computing," IBM J. Res & DEV. vol. 57, No. 3/4 Paper, May 6/Jul. 2013.
Glennon, Jr., John C.; "Motor Vehicle Crash Investigation and Reconstruction," BSAT, 2001, 4 pgs.
Gonzalez Ribeiro, Ana, "Surprising things your home insurance covers," Jan. 12, 2012 in Insurance; 4 pages.
Hopkins, Brian, "Big Opportunities in Big Data Positioning Your Firm to Capitalize in a Sea of Information," Enterprise Architecture Professionals, Forrester Research, Inc., pp. 1-9, May 2011.
Iwasaki, Yoji; Yamazaki, Fumimo, Publication Info: 32nd Asian Conference on Remote Sensing 2011, ACRS 2011 1: 550-555. Asian Association on Remote Sensing. (Dec. 1, 2011) (Year: 2011).
Kopp et al., "Full-scale testing of low-rise, residential buildings with realistic wind loads", 2012, 15 pages.
McKeown et al., "OpenFlow: Enabling Innovation in Campus Networks," pp. 1-6, Mar. 14, 2008.
Melnik, Sergey et al., "Dremel: Interactive Analysis of Web-Scale Datasets," 36th International Conference on Very Large Data Bases, Sep. 13-17, 2010, Singapore, Proceedings of the VLDB Endowment, vol. No. 1.
NYSE Technologies Website and Fact Sheet for Data Fabric 6.0 Aug. 2011, https://web.archive.org/web/20110823124532/http://nysetechnologies.nyx.com/data-technology/data-fabric-6-0.
Richardson, Alexis, "Introduction to RabbitMQ, An Open Source Message Broker That Just Works," Rabbit MQ, Open Source Enterprise Messaging, pp. 1-36, May 13, 2009.
Stefan Theußl, "Applied High Performance Computing Using R," Diploma Thesis, Univ. Prof, Dipl, Ing. Dr. Kurt Hornik, pp. 1-126, Sep. 27, 2007.
STIC search dated Jan. 4, 2019 (Year 2019).
Wang, Guohul et al., "Programming Your Network at Run-time for Big Data Applications," IBM T.J. Watson Research Center, Rice University, HotSDN'12, Aug. 13, 2012, Helsinki, Finland.
Wang, Jianwu et al., "Kepler + Hadoop: A General Architecture Facilitating Data-Intensive Applications in Scientific Workflow Systems," Works 09, Nov. 15, 2009, Portland, Oregon, USA.
Webb, Kevin C. et al., "Topology Switching for Data Center Networks," Published in: Proceeding Hot-ICE'11 Proceedings of the 11th USENIX conference on Hot topics in management of Internet, cloud, and enterprise networks and services, Mar. 29, 2011.
Xi et al., "Enabling Flow-Based Routing Control in Data Center Networks using Probe and ECMP," Polytechnic Institute of New York University, IEE INFOCOM 2011, pp. 614-619.
Zevnik, Richard. The Complete Book of Insurance. Sphinx. 2004. pp. 76-78.
U.S. Appl. No. 14/251,377, filed Apr. 11, 2014, Devereaux et al.
U.S. Appl. No. 14/251,392, filed Apr. 11, 2014, Allen et al.
U.S. Appl. No. 14/251,404, filed Apr. 11, 2014, Devereaux et al.
U.S. Appl. No. 14/251,411, filed Apr. 11, 2014, Allen et al.
U.S. Appl. No. 14/273,877, filed May 9, 2014, Allen et al.
U.S. Appl. No. 14/273,889, filed May 9, 2014, Devereaux et al.
U.S. Appl. No. 14/273,918, filed May 9, 2014, Allen et al.
U.S. Appl. No. 14/278,182, filed May 15, 2014, Allen et al.
U.S. Appl. No. 14/278,202, filed May 15, 2014, Allen et al.
U.S. Appl. No. 14/303,336, filed Jun. 12, 2014, Devereaux et al.
U.S. Appl. No. 14/303,347, filed Jun. 12, 2014, Devereaux et al.
U.S. Appl. No. 14/303,370, filed Jun. 12, 2014, Allen et al.
U.S. Appl. No. 14/303,382, filed Jun. 12, 2014, Allen et al.
U.S. Appl. No. 14/305,732, filed Jun. 16, 2014, Devereaux et al.
U.S. Appl. No. 14/324,534, filed Jul. 7, 2014, Devereaux et al.
U.S. Appl. No. 14/324,546, filed Jul. 7, 2014, Devereaux et al.
U.S. Appl. No. 14/324,609, filed Jul. 7, 2014, Devereaux et al.
U.S. Appl. No. 14/324,618, filed Jul. 7, 2014, Devereaux et al.
U.S. Appl. No. 14/324,748, filed Jul. 7, 2014, Devereaux et al.
U.S. Appl. No. 14/324,759, filed Jul. 7, 2014, Devereaux et al.
U.S. Appl. No. 14/494,207, filed Sep. 23, 2014, Campbell.
U.S. Appl. No. 14/572,413, filed Dec. 16, 2014, Devereaux et al.
U.S. Appl. No. 14/573,981, filed Dec. 15, 2014, Allen et al.
U.S. Appl. No. 14/862,776, filed Sep. 23, 2015, Devereaux et al.
U.S. Appl. No. 14/941,225, filed Nov. 13, 2015, Billman et al.
U.S. Appl. No. 14/941,262, filed Nov. 13, 2015, Hopkins et al.
U.S. Appl. No. 15/244,847, filed Aug. 23, 2016, Devereaux et al.
U.S. Appl. No. 15/365,555, filed Nov. 30, 2016, Devereaux et al.
U.S. Appl. No. 15/365,611, filed Nov. 30, 2016, Devereaux et al.
U.S. Appl. No. 15/365,676, filed Nov. 30, 2016, Devereaux et al.
U.S. Appl. No. 15/365,706, filed Nov. 30, 2016, Devereaux et al.
U.S. Appl. No. 15/365,721, filed Nov. 30, 2016, Devereaux et al.
U.S. Appl. No. 15/365,725, filed Nov. 30, 2016, Devereaux et al.
U.S. Appl. No. 15/365,736, filed Nov. 30, 2016, Devereaux et al.
U.S. Appl. No. 15/365,745, filed Nov. 30, 2016, Devereaux et al.
U.S. Appl. No. 15/365,754, filed Nov. 30, 2016, Devereaux et al.
U.S. Appl. No. 15/365,764, filed Nov. 30, 2016, Devereaux et al.
U.S. Appl. No. 15/365,773, filed Nov. 30, 2016, Devereaux et al.
U.S. Appl. No. 15/365,786, filed Nov. 30, 2016, Devereaux et al.

\* cited by examiner

ELECTRONIC SENSOR MANAGEMENT

CROSS REFERENCE TO RELATED APPLICATIONS

This application is a Continuation of U.S. patent application Ser. No. 15/887,776, filed on Feb. 2, 2018, which is a Continuation-in-Part of U.S. patent application Ser. No. 15/652,053, filed on Jul. 17, 2017, which is a Continuation Application of U.S. patent application Ser. No. 14/251,404, filed on Apr. 11, 2014, which claims priority to U.S. Provisional patent application Ser. Nos.: 61/926,093, filed Jan. 10, 2014; 61/926,091, filed Jan. 10, 2014; 61/926,095, filed Jan. 10, 2014; 61/926,098, filed Jan. 10, 2014; 61/926,103 filed Jan. 10, 2014; 61/926,108, filed Jan. 10, 2014; 61/926,111, filed Jan. 10, 2014; 61/926,114, filed Jan. 10, 2014; 61/926,118, filed Jan. 10, 2014; 61/926,119, filed Jan. 10, 2014; 61/926,121 filed Jan. 10, 2014; 61/926,123 filed Jan. 10, 2014; 61/926,536, filed Jan. 13, 2014; 61/926,541, filed Jan. 13, 2014; 61/926,534 filed Jan. 13, 2014; 61/926,532 filed Jan. 13, 2014; 61/943,897, filed Feb. 24, 2014; 61/943,901, filed Feb. 24, 2014; 61/943,906, filed Feb. 24, 2014; and 61/948,192, filed Mar. 5, 2014 which are each incorporated herein by reference in its entirety.

TECHNICAL FIELD

The disclosed embodiments generally relate to a method and computerized system for managing electronic sensors.

BACKGROUND

Smart home technology refers to control and even automation of different house functionalities, such as lighting, heating, ventilation, air conditioning (HVAC), and security, as well as home appliances such as washer/dryers, ovens or refrigerators/freezers. Homeowners may install several sensors (each configured to collect a certain type of data) and may monitor different aspects and functionalities within their homes. For example, a homeowner may install a smart thermostat, which monitors temperature patterns and may even adjust the temperature based on the detected pattern. As the smart home technology has advanced recently, technical challenges have also been identified. For instance, conventional smart home software solutions provide a single category solution with limited intra-communication ability. For example, a smart thermostat may determine a temperature pattern or adjust the temperature; however, (due to technical challenges) the smart thermostat may not be able to communicate with other sensors. In another example, a water sensor (configured to detect flooding) may monitor the water pressure/usage and alert the homeowner when it detects flooding by determining that the water usage is higher than a pre-determined threshold. However, the water sensor is not in communication with other sensors and may provide erroneous alerts simply because the water consumption is higher than a pre-determined threshold and not account for warranted increase in water consumption. Existing and conventional methods fail to provide fast and efficient analysis of building condition data and fail to provide effective communication between different sensors due to a high volume of building condition data captured by different sensors on different networks and/or computing infrastructures. Managing such information is difficult due to data type, size, or content associated with different sensors.

SUMMARY OF THE INVENTION

For the aforementioned reasons, there is a need for a centralized server system for efficient and fast processing large sets of building condition data, communicating with different sensors, utilizing the collected data to make appropriate modifications to different sensors by controlling/modifying the functional behavior of different sensors, and providing accurate alerts when needed.

In an embodiment, a computer-implemented method may comprise receiving, by a server, a first set of building condition data from a plurality of building condition sensor devices associated with a building, wherein the plurality of building condition sensor devices comprises at least a water flow sensor; upon the first set of building condition data satisfying a first threshold, generating, by the server, an activate instruction; upon transmitting the activation instruction to one or more motion sensor devices, receiving, by the server, a second set of building condition data, wherein the activation instruction commands the one or more motion sensor devices to immediately capture data, wherein the one or more motion sensor devices is configured to detect any motion within the building; upon the second set of building condition data indicating presence of at least on inhabitant within the building, determining, by the server, whether the first set of building condition data satisfies a second threshold; upon the first set of building condition data satisfying the second threshold, generating, by the server, a second instruction configured to command a valve sensor to terminate a water supply to the building.

In another embodiment, a computer-implemented method may comprise receiving, by a server, a first set of building condition data from a plurality of building condition sensor devices associated with a building comprising a first sensor device; upon the first set of building condition data satisfying a first threshold, generating, by the server, an activate instruction; upon transmitting the activation instruction to a second sensor device, receiving, by the server, a second set of building condition data from the second sensor device, wherein the activation instruction commands the second sensor device to immediately capture data; upon the second set of building condition data satisfying a second threshold, determining, by the server, whether the first set of building condition data satisfies a third threshold; upon the first set of building condition data satisfying the second threshold, generating, by the server, an electronic notification comprising at least one of the first and the second set of building condition data; and transmitting, by the server, the electronic notification to a computing device associated with the building.

In yet another embodiment, a computer system may include a a plurality of building condition sensor devices configured to capture building condition data associated with a building, wherein each building condition sensor is configured to capture data in accordance with a frequency of data capture value; a server coupled to each building condition sensor and configured to: receive a first set of building condition data from the plurality of building condition sensor devices associated with a building comprising a first building condition sensor device; upon the first set of building condition data satisfying a first threshold, generate an activate instruction; upon transmitting the activation instruction to a dormant second building condition sensor device, receive a second set of building condition data from the dormant second building condition sensor device, wherein the activation instruction commands the dormant second building condition sensor device to alter its frequency of data capture and commands the second set of building condition data to immediately capture data, wherein previous to receiving the activation instruction, the dormant second building condition sensor device captured data in accordance with a zero frequency of data capture; upon the second set of building condition data satisfying a second threshold, determine whether the first set of building condition data satisfies a third threshold; upon the first set of building condition data satisfying the third threshold, generate an electronic notification comprising at least one of the first and the second set of building condition data; and transmit the electronic notification to a computing device associated with the building.

BRIEF DESCRIPTION OF THE DRAWINGS

The accompanying appendices and/or drawings illustrate various non-limiting, example, inventive aspects in accordance with the present disclosure.

DETAILED DESCRIPTION

Figure 1A:
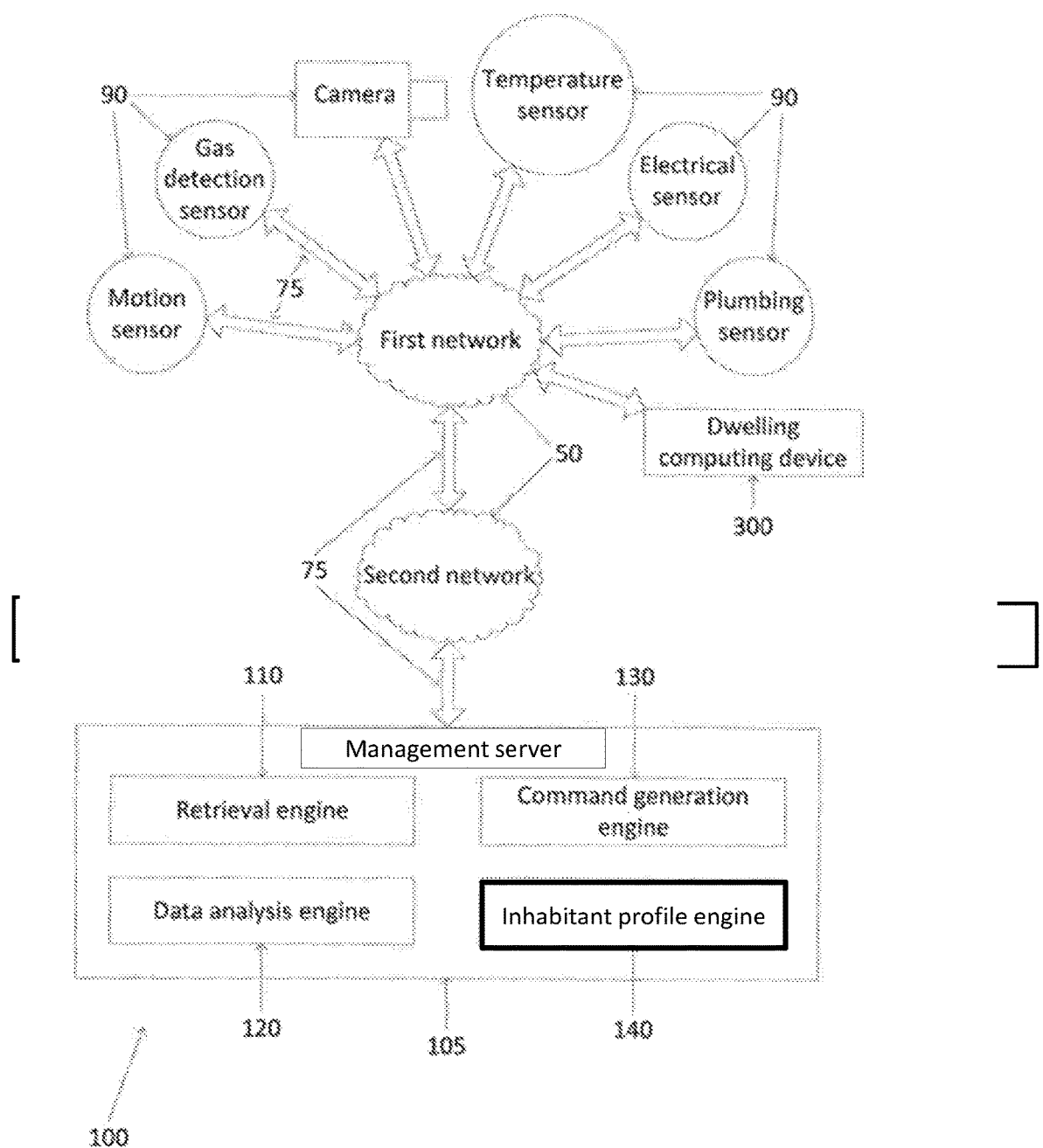
FIG. 1A illustrates an example computer system for managing electronic sensors, in accordance with an embodiment.

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments. Also, the flow charts and methods described herein do not imply either required steps or a required order to the steps, and the illustrated embodiments and processes may be implemented in any order and/or combination that is practicable.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the illustrated embodiments, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims. Commonly assigned U.S. Pat. Nos. 8,289,160 and 8,400,299 are related to certain embodiments described herein and are each incorporated herein by reference in their entirety.

As used herein, the term "dwelling" means a building or structure in which one or more persons reside, including a single family home, duplex, apartment building or other multi-family structure, a mobile home, and/or a manufactured home.

Turning now descriptively to the drawings, FIG. 1A depicts an exemplary system 100 communicatively connected to electronic sensors at a dwelling in which below illustrated embodiments may be implemented. It is to be understood that first and second networks 50 may be each a geographically distributed collection of nodes interconnected by communication links and segments for transporting data between end nodes, such as personal computers, work stations, smart phone devices, tablets, televisions, sensors and or other devices such as automobiles, etc. Many types of networks are available, with the types ranging from local area networks (LANs) to wide area networks (WANs). LANs typically connect the nodes over dedicated private communications links located in the same general physical location, such as a dwelling, structure, residence or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others.

Communications 75 represents computerized communications as known by those skilled in the art. For instance, communications 75 may be wired links or may comprise a wireless communication medium, where certain nodes are in communication with other nodes, e.g., based on distance, signal strength, current operational status, location, etc. Moreover, each of the devices can communicate data packets (or frames) with other devices using predefined network communication protocols as will be appreciated by those skilled in the art, such as various wired protocols and wireless protocols etc., where appropriate. In this context, a protocol consists of a set of rules defining how the nodes interact with each other. Those skilled in the art will understand that any number of nodes, devices, links, etc. may be used in the computer network, and that the view shown herein is for simplicity. Also, while the embodiments are shown herein with reference to a general network cloud, the description herein is not so limited, and may be applied to networks that are hardwired. One skilled in the art will appreciate that each communication 75 may represent an encrypted and secure communication between a sensor and a dwelling computing device 300. For example, each sensor may include a transmitter that securely connect and transmit data to a dwelling computing device 300 using the first network 50.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. For exemplary purposes and without limitations, examples of the computer readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the server computer, partly on the server computer, as a stand-alone software package, partly on the server computer and partly on a remote computer (such as dwelling computing device 300) or entirely on the remote computer. In the latter scenario, the remote computer may be connected to the server computer through any type of network, including a local area network (LAN) or a wide area network (WAN), a combination thereof, or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions that execute on the computer or other programmable apparatus provide processes for implementing the functions/acts specified in the flowchart and/or block diagram block or blocks.

Turning to FIG. 1A, system 100 preferably includes sensors 90 and management server 105 that preferably includes retrieval engine 110, data analysis engine 120, command generation engine 130 and inhabitants profile engine 140. In one embodiment, first network 50 is a LAN and second network 50 is a WAN (best shown in FIG. 1A), such as the internet, although it is contemplated herein that networks 50 may be any system and/or method of computerized communications as understood by those skilled in the art.

Figure 2:
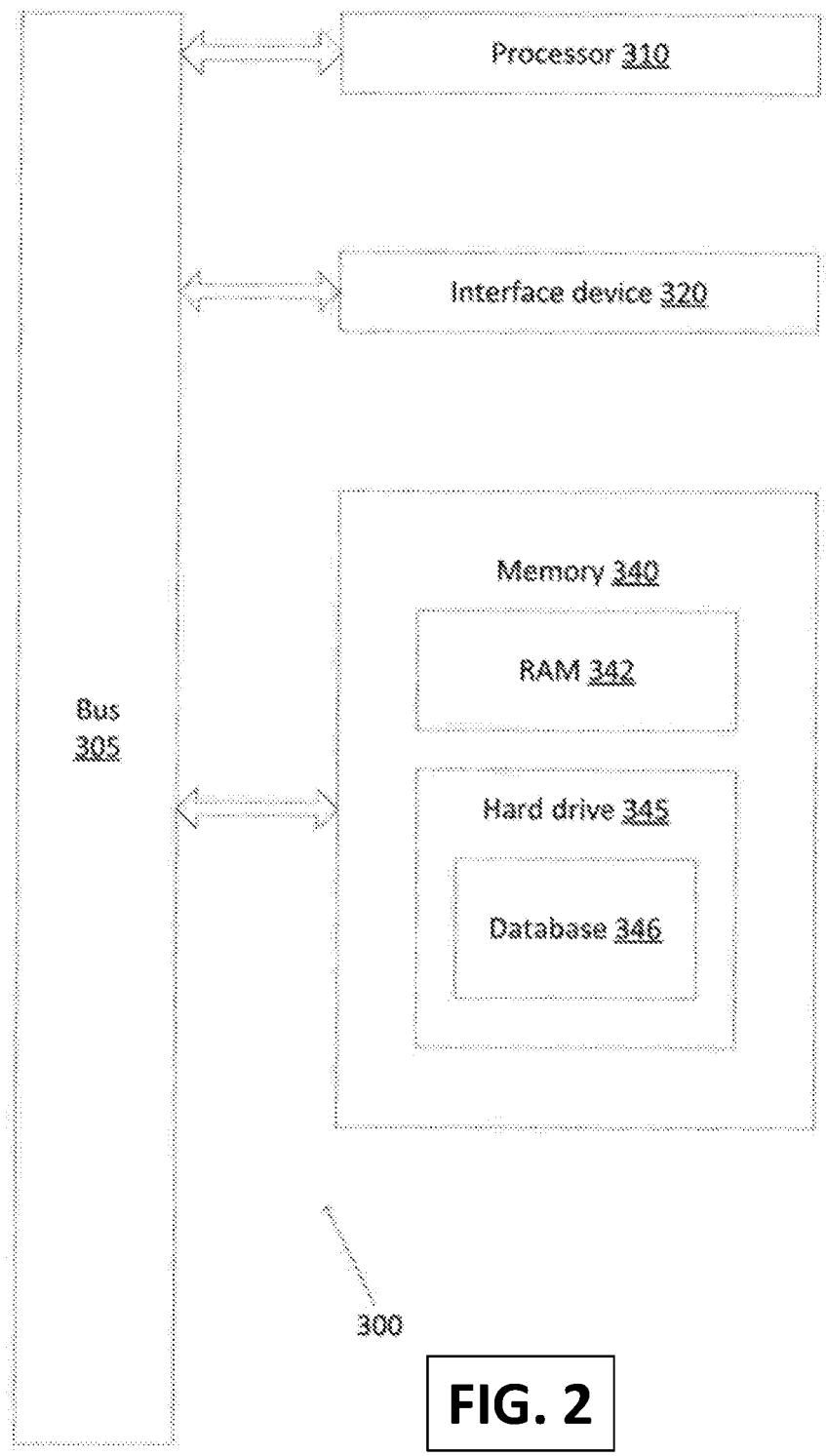
FIG. 2 illustrates a network computer device/node in accordance with an embodiment.

FIG. 2 is a schematic block diagram of an example dwelling computing device 300 that may be used (or components thereof) with one or more embodiments described herein. As explained above, in different embodiments these various devices can be configured to communicate with each other in any suitable way, such as, for example, via communication 75 over networks 50.

Dwelling computing device 300 is only one example of a suitable system and is not intended to suggest any limitation as to the scope of use or functionality of embodiments of the invention described herein. Regardless, dwelling computing device 300 is capable of being implemented and/or performing any of the functionality set forth herein.

Dwelling computing device 300 is operational with numerous other general purpose or special purpose computing system environments or configurations. Examples of well-known computing systems, environments, and/or configurations that may be suitable for use with dwelling computing device 300 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed data processing environments that include any of the above systems or devices, and the like.

Dwelling computing device 300 may be described in the general context of computer system-executable instructions, such as program modules, being executed by a computer system. Generally, program modules may include routines, programs, objects, components, logic, data structures, and so on that perform particular tasks or implement particular abstract data types. Dwelling computing device 300 may be practiced in distributed data processing environments where tasks are performed by remote processing devices that are linked through a communications network. In a distributed data processing environment, program modules may be located in both local and remote computer system storage media including memory storage devices.

Dwelling computing device 300 is shown in FIG. 2 in the form of a general-purpose computing device. The components of dwelling computing device 300 may include, but are not limited to, one or more processors or processing units 310, a system memory 340, interface device 320, and a bus 305 that couples various system components including system memory 340 to processing unit 310.

Bus 305 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Dwelling computing device 300 typically includes a variety of computer system readable media. Such media may be any available media that is accessible by the dwelling computing device 300, and it includes both volatile and non-volatile media, removable and non-removable media.

System memory 340 can include computer system readable media in the form of volatile memory, such as random access memory (RAM) 342, cache memory, and hard drive 345, which may include database 346. Dwelling computing device 300 may further include other removable/non-removable, volatile/non-volatile computer system storage media. By way of example only, hard drive 345 can be provided for reading from and writing to a non-removable, non-volatile magnetic media. Interface device 320 includes, without limitation, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 305 by one or more data media interfaces. As will be further depicted and described below, memory 340 may include at least one program product having a set (e.g., at least one) of program modules that are configured to carry out the functions of embodiments of the invention.

Management server 105, preferably has a set (at least one) of engines, such as retrieval engine 110, data analysis engine 120, command generation engine 130, and inhabitant profile engine may be stored in memory 340 by way of example, and not limitation, as well as an operating system, one or more application programs, other program modules, and program data. Each of the operating system, one or more application programs, other program modules, and program data or some combination thereof, may include an implementation of a networking environment. Management server 105 generally carry out the functions and/or methodologies of embodiments of the invention as described herein.

Dwelling computing device 300 may also communicate with one or more interface devices 320 such as a keyboard, a pointing device, a display, etc.; one or more devices that enable a user to interact with dwelling computing device 300; and/or any devices (e.g., network card, modem, etc.) that enable dwelling computing device 300 to communicate with one or more other computing devices. Such communication can occur via Input/Output (I/O) interfaces. Still yet, dwelling computing device 300 can communicate with one or more networks such as a local area network (LAN), a general wide area network (WAN), and/or a public network (e.g., the Internet) via a network adapter, which communicates with the other components of dwelling computing device 300 via bus 305. It should be understood that although not shown, other hardware and/or software components could be used in conjunction with dwelling computing device 300. Examples, include, but are not limited to: microcode, device drivers, redundant processing units, external disk drive arrays, RAID systems, tape drives, and data archival storage systems, etc.

Figure 1B:
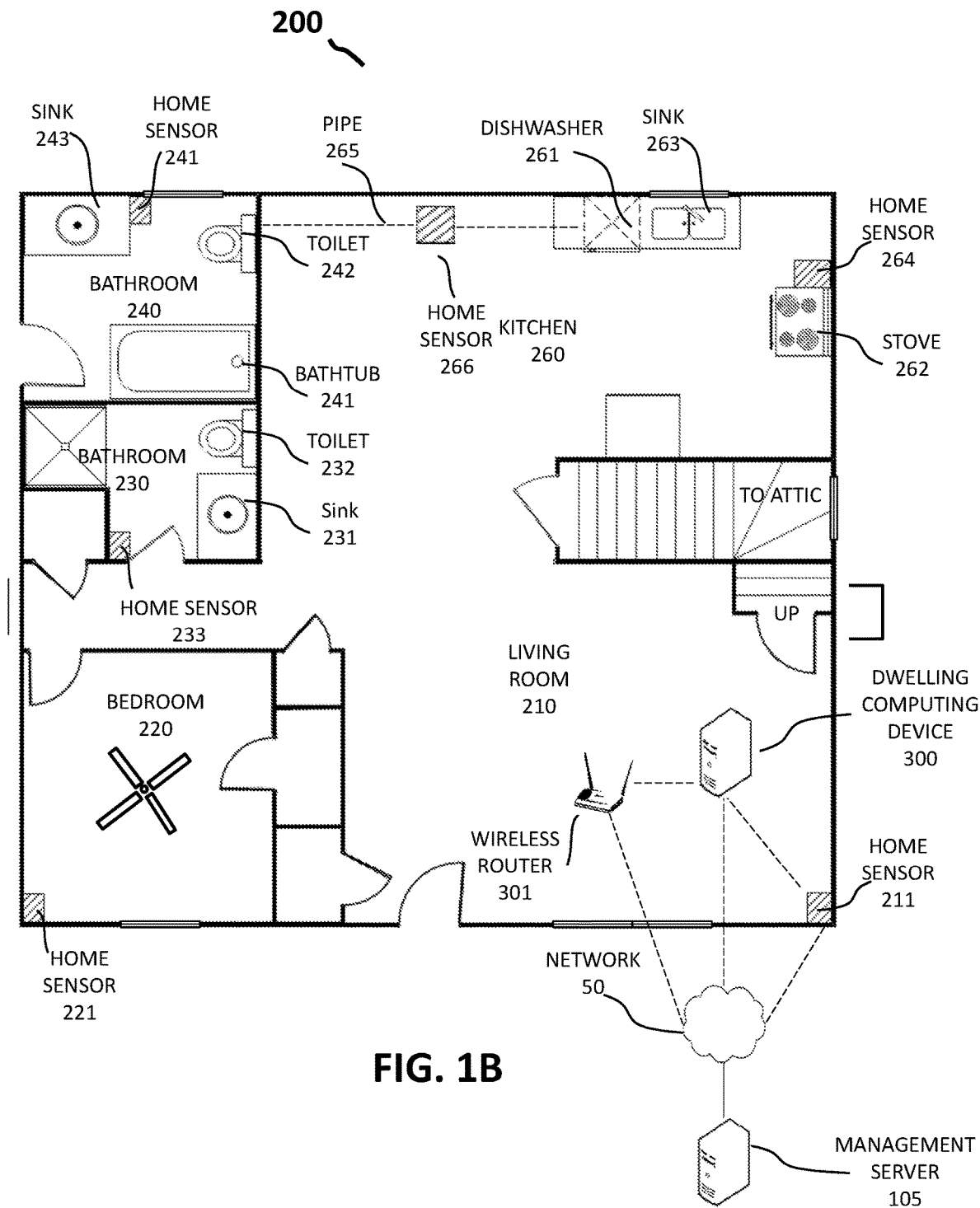
FIG. 1B illustrates a floor plan of an example dwelling with multiple home sensors, in accordance with an embodiment.

FIGS. 1A-B and 2 are intended to provide a brief, general description of an illustrative and/or suitable exemplary environment in which embodiments of the below described present invention may be implemented. FIGS. 1 and 2 are exemplary of a suitable environment and are not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

With regards to the sensors 90 shown in FIG. 2, each sensor 90 preferably captures certain data related to a structure or dwelling. It is contemplated herein that structures include any type of building (e.g., residential, commercial, retail, municipal, etc.) in which the capture and analysis of sensor data is useful for the reasons at least described herein. Within the present disclosure, structure, dwelling, and home are used interchangeably. In one embodiment, sensors 90 communicate directly with management server 105. However, it is contemplated herein that sensors 90 may communicate with dwelling computing device 300 operating on the same network 50 (best shown in FIG. 1A). In this embodiment, dwelling computing device 300 receives information from sensors 90 and communicates the information to management server 105. Dwelling computing device 300 may immediately transfer the information to management server 105, it may be a delayed transfer (e.g., scheduled for the middle of the night when internet usage is low), and/or it may be any communication methodology as known by those skilled in the art. Dwelling computing device 300 is preferably configured and operational to receive (capture) data from various sensors 90 regarding certain measured aspects of the dwelling and transmit that captured data to a management server 105 via network 50. It is noted that dwelling computing device 300 may perform analytics regarding the captured sensor data regarding the structure, and/or management server 105, preferably located or controlled by an insurance company/carrier, may perform such analytics, as also further described below. Further, sensors 90 may be connected to dwelling computing device 300 by wire, or by a wireless technology, or via any communication methodology as known by those skilled in the art.

Although various sensor types are illustrated in FIG. 1A and described below, the sensor types described and shown herein are not intended to be exhaustive as embodiments of the present invention may encompass any type of known or unknown sensor type which facilitates the purposes and objectives of the certain illustrated embodiments described herein. Exemplary sensor types include (but are not limited to):

Motion sensor—One type of motion sensor 90 detects motion within a range of sensor 90. Thus, motion sensor 90 may be placed to detect when people, animals and/or objects move within sensor's 90 field of vision. Another type of sensor 90 may sense motion in the structure to which sensor 90 is attached. Although structures typically do not move, in the event of an earthquake, flood, damage to that part of the structure, and/or other devastating event, motion sensor 90 may detect the movement of the structure itself.

Temperature sensor—Temperature sensor 90 detects the temperature of the desired medium. Thus, temperature sensor 90 may be configured to measure the temperature of ambient air or of a specific surface (e.g., the wall to which temperature sensor 90 is attached). It is contemplated herein that temperature sensor 90 may be placed outside the structure (e.g., on an outside wall and/or the roof), inside the structure (e.g., on an interior wall, an interior ceiling, an interior floor, a basement, an attic, a kitchen, a bathroom, a bedroom, a workspace, etc.), or at a boundary therebetween.

Humidity sensor—As with other sensors 90, humidity sensor 90 may be placed anywhere inside/outside/on the structure as recognized by those skilled in the art.

Gas detection sensor—Detects the presence of various gasses. As with other sensors 90, gas detection sensor 90 may be placed anywhere inside/outside/on the structure as recognized by those skilled in the art. For exemplary purposes only and without limitation, gas detection sensor may be configured to detect the presence of carbon monoxide (or any other harmful gasses, such as radon), oxygen, and/or methane (or any other flammable gasses). Further, the readings may be binary (e.g., either the gas is present or it is not present), or the readings may be quantitative (e.g., the percentage of air the comprises the gas, parts per million of the gas). The gas detection sensor 90 can also determine gas flow of gas pipes within the dwelling. For example, the gas detection sensor 90 may be installed on, in, or near one or more gas pipes and may use heat displacement technology or other methods known in the art to detect gas flow within the dwelling's gas pipes. Similar to other sensors, the management server 105 may use data captured by the gas detection sensor 90 to determine risk and (using the methods disclosed below) may terminate the gas supply of the dwelling, notify the inhabitants, and/or send a maintenance request to a third party. For example, if the management server 105 detects a high risk of fire (e.g., risk of fire satisfying a threshold), it may terminate the gas flow within the dwelling.

Smoke detector sensor—Detects the presence of smoke. As with other sensors 90, smoke detection sensor 90 may be placed anywhere inside/outside/on the structure as recognized by those skilled in the art. The readings of smoke detection sensor may be binary (e.g., either the gas is present or it is not present), or the readings may be quantitative (e.g., the percentage of air the comprises smoke, parts per million of smoke).

Water pressure sensor—Detects the water pressure at various locations within the structure. Water pressure sensors 90 may be placed anywhere inside or outside the structure and thus may provide information related to the stresses being induced upon the structure's plumbing system (including sewer lines, water lines, HVAC system, appliances, and automatic fire suppression systems). This information may be utilized by management server to indicate a plumbing system that is operating close to stress limits, and thus, a structure for which water damage may be more likely.

Water flow sensor—Detects the amount of water flowing through selected points in the plumbing system (including sewer lines, water lines, HVAC system, appliances, and automatic fire suppression systems). Water flow sensor 90 may be placed anywhere inside or outside the structure and thus may provide information related to the amount of water being routed to the structure, and more particularly, which parts of the structure are receiving exactly (or approximately) how much water.

Wind speed sensor—Wind speed sensor 90 detects the wind speed at that location and may be placed anywhere inside or outside the structure.

Air pressure sensor—Air pressure sensor 90 may be placed anywhere inside or outside the structure. This information may be analyzed, for example, to determine how quickly and easily the structure equalizes air pressure changes to the outside ambient air.

Electrical system sensor—Electrical system sensor 90 detects the operational parameters of the structure's electrical system. Readings from sensor 90 could be used to determine if the voltage is (persistently) too high, too low, or if the voltage frequently drops and/or spikes. Such conditions may suggest that the dwelling 300 is at risk for fire. The management server 105 may use data captured by the electrical system sensor 90 to determine a risk associated with an "arc fault," which occurs when electrical current of a dwelling veers off its intended path (often through a breach in wiring or other wiring issues) and cause electrical fires. As described below, the management server 105 may use data captured by the electrical system sensor to determine a risk of fire and terminate the electric supply to the dwelling (or a specific section at risk, such as the attic), send a notification to any of the inhabitants or emergency responders, and/or transmit a maintenance request to a third party. Other types of electrical measurements could be taken, such as readings of current flowing through the electrical system. Still other types of electrical measurements could be determined include how energy is used and at what times of day it is used, etc.

Structural sensor—Structural sensor 90 may be configured to detect the (changing) conditions of the structure's elements (e.g., support beams, floors, ceilings, roofs, walls, etc.). Structural readings from one or more locations inside and/or outside the structure could thus be recorded by sensor 90 and transmitted to management server 105.

Environmental Sensor—Environmental sensor 90 may be configured to detect various environmental conditions relating to the dwelling, such as the air quality present in the structure, the presence of mold/bacteria/algae/lead paint or any contaminant adverse to human health (whether airborne or attached to a portion of the structure of the structure).

Camera Sensor—Camera sensors include visible light cameras, infrared cameras, two-dimensional (2D) cameras, three-dimensional (3D) cameras, thermal cameras, aerial imagery cameras, Smartphone camera images, radar-capable sensors, sensors that detect other wavelengths, and/or any combination thereof.

With exemplary sensors 90 identified and briefly described above, and as will be further discussed below, it is to be generally understood sensors 90 preferably record certain data parameters relating to dwelling conditions and the products therein. The data recorded may be used by the management server 105 and other computing devices to determine different conditions and indicators associated with the dwelling and may be used to manage (e.g., modify) the functional behavior of the sensors. It is to be understood and appreciated the aforementioned sensors 90 may be configured as wired and wireless types integrated in a networked environment (e.g., WAN, LAN, WiFi, 802.11X, 3G, LTE, etc.), which may also have an associated IP address. It is to be further appreciated the sensors 90 may consist of internal sensors located within the interior of a structure; external sensors located external of a structure; sound sensors for detecting ambient noise (e.g., for detecting termite and rodent activity, glass breakage, intruders, etc.); camera sensors (e.g., visible light, infrared light and/or any wavelength) such as those consisting of camera standalone devices, or by integrating into existing camera devices in a structure. It is additionally to be understood and appreciated that sensors 90 can be networked into a central computer hub (e.g., dwelling computing device 300) in a dwelling to aggregate collected sensor data packets or sensors 90 may be communicatively connected to other sensors 90 and/or dwelling computing device 300 (e.g., hard wired to either). Aggregated data packets can be analyzed in either a structure computer system (e.g., dwelling computing device 300) or via an external computer environment (e.g., management server 105). Additionally, it is to be understood data packets collected from sensors 90 can be aggregated in dwelling computing device 300 and sent as an aggregated packet to management server 105 for subsequent analysis whereby data packets may be transmitted at prescribed time intervals (e.g., a benefit is to reduce cellular charges in that some structures may not have Internet access or to send during low internet usage hours).

In accordance with an illustrated embodiment, in addition to the aforementioned, dwelling computing device 300 may additionally be coupled to a clock, which may keep track of time for sensors 90, thereby allowing a given item of data to be associated with the time at which the data was captured. For example, sensor 90 may recurrently capture readings of temperature, wind speed, humidity, appliance operating times, etc., and may timestamp each reading. The time at which the readings are taken may be used to reconstruct events or for other analytic purposes, such as those described herein. For example, the timestamps on wind speed readings taken during a hurricane may allow it to be determined, after the hurricane has occurred, how quickly the wind speed rose in the vicinity of the structure.

A storage component may further be provided and utilized to store data readings and/or timestamps in sensors 90. For example, a storage component may include, or may otherwise make use of, magnetic or optical disks, volatile random-access memory, non-volatile random-access memory, or any other type of storage device. There may be sufficient data storage capacity to store several hours or several weeks of data readings. For example, the severe part of a hurricane might last for half a day, a full day, or several days. A storage component might have sufficient storage capacity to allow twelve or more hours of readings to be stored, thereby allowing forensic reconstruction of how the hurricane affected the structure during the full time that the structure was experiencing the hurricane's impact.

A communication component may further be provided and utilized to communicate recorded information from the dwelling computing device 300 to an external location, such as management server 105. The communication component may be, or may comprise, a network communication card such as an Ethernet card, a WiFi card, or any other communication mechanism. However, the communication component could take any form and is not limited to these examples. The communication component might encrypt data that it communicates, in order to protect the security and/or privacy of the data. Additionally, data from sensors 90, a computerized clock and/or a storage component may be communicated directly to management server 105, via network 50, thus obviating or mitigating the need for dwelling computing device 300. In an embodiment, each sensor 90 may be associated with (e.g., internally or externally) to a transmitter with a unique IP address. The transmitter may use a public or private network to transmit the captured data from the sensors 90 to the management server 105. The transmitter may also encrypt the data in order to avoid a bad actor's unwanted interference.

Management server 105 may include, or otherwise may cooperate with, retrieval engine 110. Retrieval engine 110 receives information from sensors 90 and/or dwelling computing device 300. In one embodiment, retrieval engine 110 sends a query to dwelling computing device 300 to respond with data generated by sensors 90. In another embodiment, retrieval engine 110 sends a query to sensors 90 to retrieve data they generated. In yet another embodiment, sensors 90 may send data to retrieval engine 110 as the data is generated. In still another embodiment, sensors 90 store data and periodically (e.g., every night at 3:00 A.M.) send to retrieval engine. However, such is not an exhaustive list of methods of communicating data from sensors 90 to retrieval engine 110, and it is contemplated herein that data may be sent in any way as known in the art, including permutations of methods described herein.

In one embodiment a single instance of management server 105 receives communications from sensors 90 at a plurality of structures/locations (e.g., thousands of sensor locations communicating to a single management server 105), however it is contemplated herein that any permutation of sensor(s) 90 (including those of the same and differing types) and management server(s) 105 may be utilized as would be readily understood by those skilled in the art.

Management server 105 may further include data analysis engine 120 that analyzes data that has been generated by sensors 90. Data analysis engine 120 may apply pre-determined rules and thresholds to determine if conditions have been met to allow or require modification of the terms of an insurance policy, such as lowering the deductible amount for a home insurance policy.

For exemplary purposes only, if humidity sensors 90 in the structure's basement detect consistently low levels of humidity, such may indicate a water-tight seal in the basement, and such may be sufficient to lower the deductible (e.g., lowering the deductible for all claims, or lowering the deductible for all water damage claims, or lowering the deductible for water damage claims in the basement alone).

In another example, if temperature sensors 90, possibly in combination with (infrared) cameras detect that point sources of heat/fire (e.g., candles, hot plates, toaster ovens, oven, stove, grill, space heater) are never and/or rarely operated outside the presence of an attendant person, then such may be sufficient to lower the deductible (e.g., for all claims, for only fire damage claims, for only fire damage claims caused by point sources of heat/fire).

In yet another example, if gas detection sensor 90 detects low and/or non-existent levels of certain types of gases (e.g., propane, natural gas), such may indicate that the gas fixtures have been welded correctly, and such may be sufficient to lower the deductible (e.g., all claims, just fire-related damage claims, just fire-related damage claims caused by the gas being tested). In still another example, if gas detection sensor 90 detects low and/or non-existent levels of certain types of gases (e.g., gases that may leak into the basement through the wall such as radon) in the basement and/or the structure, such may indicate good waterproofing of the basement and/or a lack of cracks in the structure's support walls and foundation, and thus that may be sufficient to lower deductibles (e.g., for all claims, for only gas related claims, for only water damage claims, for all stability type claims such as those related to damages caused by earthquakes).

In another example, electrical sensor 90 or plumbing sensor 90 may indicate that the electrical system or the plumbing system, respectively, are operating (well) within normal parameters, and thus such data may be interpreted, by data analysis engine 120, as worthy of lowering the deductible (e.g., for all claims, just claims caused by the electrical system, just claims caused by the plumbing system).

In even another example, air pressure sensor 90, air speed sensor 90, and camera 90 may, working independently or in concert, indicate that the chance of a weather related damage is low, and thus lower the deductible. One such situation may be if air speed sensor 90 indicates high speed winds occur infrequently. Another such situation may be if camera 90 indicates that no/few trees and/or other things are within range of falling on the structure in the event of (severely) adverse weather. Another such situation may be if air pressure sensor 90 indicates that rapid changes in air pressure are rare/infrequent, or the air pressure never/infrequently falls below a certain threshold (e.g., 980 millibars (mb), 985 mb, 990 mb, 1,000 mb).

Management server 105 may further include command generation engine 130. Command generation engine 130 may send commands to sensors 90 or to the dwelling computing device 300. Such commands may be sent through intermediary dwelling computing device 300, or such commands may be sent directly to sensors 90. Such commands may include, for exemplary purposes only and without limitation, an instruction to take an immediate reading, an instruction to take a series of readings (e.g., every five minutes for one hour, every minute for one week), an instruction to take more frequent readings (e.g., every hour rather than every six hours), an instruction to take less frequent readings (e.g., every day rather than every hour), and/or any permutations or derivations thereof as will be known by those skilled in the art.

Management server 105 may further include inhabitant profile engine 140. The inhabitant profile engine 140 may analyze the data such as described above with respect to data analysis engine 120. It is contemplated herein that data analysis engine 120 and policy analysis engine 140 may work in cooperation/tandem, independently of each other, without interaction with the other, or any other permutations or derivations thereof as will be known by those skilled in the art. The inhabitant profile engine 140 may also generate an inhabitant dataset and continuously monitor the building condition data received to generate thresholds used by the data analysis engine 120. For example, the inhabitant profile engine may monitor water usage of the dwelling and determine that the water usage is typically higher on the weekend than weekdays. As described below, the analysis engine 120 may generate a dynamic threshold for different building condition data (e.g., water usage, electricity, and the like) based on the inhabitant's habits.

Referring now to FIG. 1B, an exemplary floor plan of a dwelling with multiple home sensors is illustrated. In this embodiment, dwelling 200 includes bathroom 240, bathroom 230, bedroom 220, living room 210, and kitchen 260. Each room within the dwelling 200 may also include different components. For example, the bathroom 240 may include sink 243, toilet 242, and bathtub 241; the bathroom 230 may include toilet 232 and sink 231; and the kitchen 260 may include stove 262, sink 263, and dishwasher 261. Dwelling 200 may also include various pluming, mechanical, and/or electrical features, such as different pipes, electrical wiring, and HVAC ducts; for clarity purposes, only pipe 265 is illustrated. Pipe 265 is a water pipe that displaces hot water to the kitchen 260 and bathroom 240. The dwelling 200 is also equipped with multiple home sensors with various functionalities and configurations. For example, dwelling 200 may include home sensor 241 (installed in the bathroom 240), home sensor 233 (installed in the bathroom 230), home sensors 221 (installed in the bedroom 221), home sensors 211 (installed in the living room 210), home sensor 264 (installed in the kitchen 260), and home sensors 266 (installed near or on the pipe 265). Each of the home sensors illustrated within the dwelling 200 may represent one or more sensors as described above (e.g., sensors 90). For example, home sensor 221 may represent two sensors installed separately (e.g., a motion sensor and a gas detection sensor) or may represent one sensor with both functionality (e.g., one sensor that is configured to detect motion and gas).

As described above, each home sensor is configured to directly communicate with the management server 105. In some embodiments, each home sensor is wirelessly (or using LAN) connected with the dwelling computing device 300, which may receive, aggregate, encrypt and/or store data before transmitting the data captured from the home sensors to the management server 105 using a wireless network such as network 50 (described in detail in FIG. 2). The management server 105 may then decrypt, disaggregate, and analyze the data from each home sensor installed within the dwelling 200 and generate instructions to command and control the functional behavior of each home sensor. The management server 105 may also reconfigure or activate any of the home sensors. For example, if the management server 105 detects that the inhabitants do not usually use bathroom 230, the management server 105 may de-activate home sensor 233 (e.g., command home sensor 233 to stop capturing data) or reconfigure home sensor 233 (e.g., change the configuration of home sensor 233 so that home sensor 233 captures data only once per month). As described below, the management server 105 may (upon various analysis of data captured from other sensors) re-activate or reconfigure home sensor 233. In another embodiment, the management server 105 may detect a water leakage in the bathroom 240 and may terminate the water flow in pipe 265.

Figure 3:
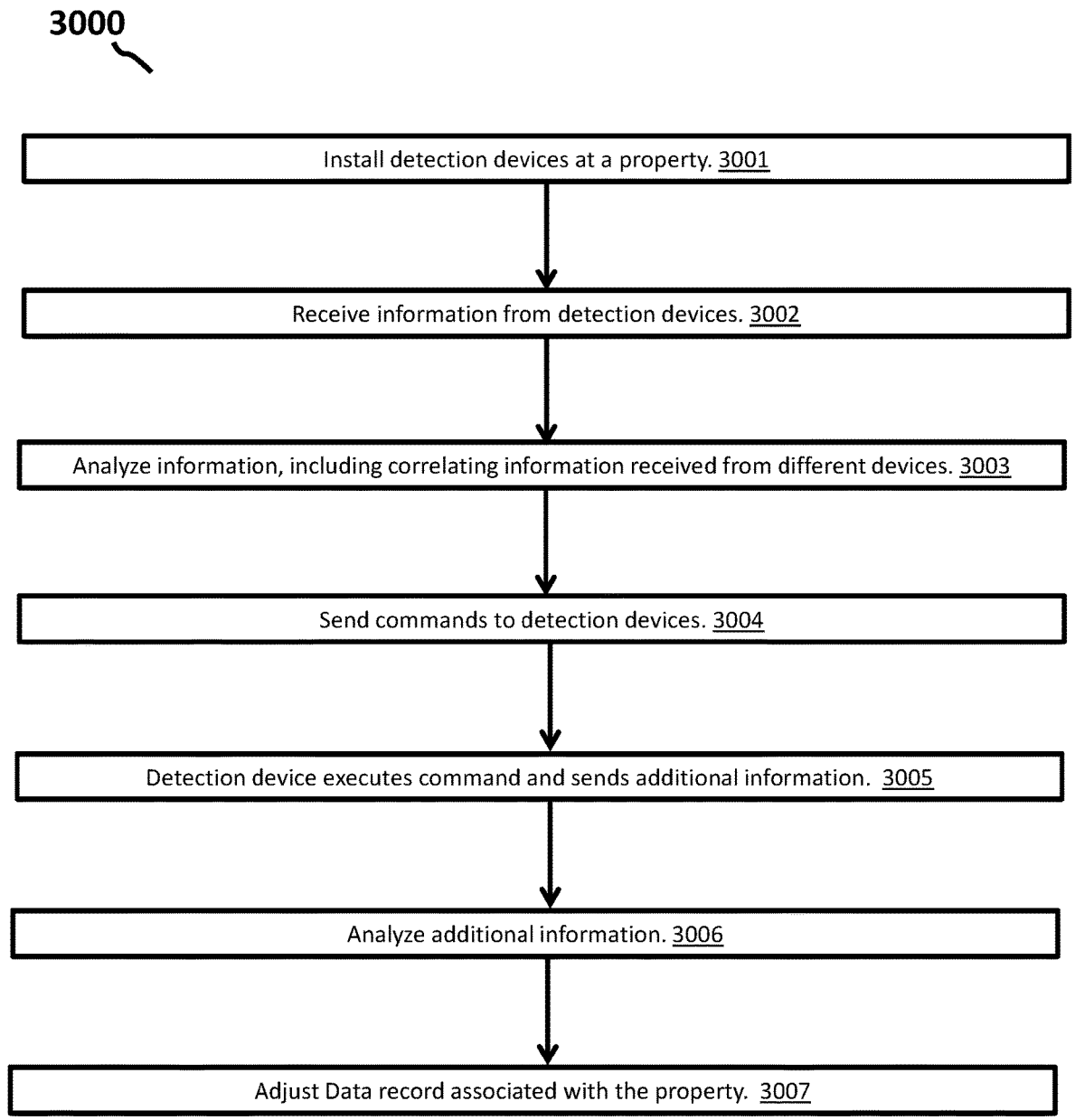
FIG. 3 is a flow diagram of operational steps for managing multiple sensors in accordance with an exemplary embodiment.

FIG. 3 shows, in the form of a flow chart (process 3000), exemplary operational steps for utilizing system 100. Before turning to descriptions of FIG. 3, it is noted that the flow diagram shown therein are described, by way of example, with reference to components shown in FIGS. 1-2, although these operational steps may be carried out in any system and are not limited to the scenario shown in the aforementioned figures. Additionally, the flow diagrams in FIG. 3 shows an example in which operational steps are carried out in a particular order, as indicated by the lines connecting the blocks, but the various steps shown in these diagrams can be performed in any order, or in any combination or sub-combination.

With reference to FIG. 3, starting at step 3001, the detection devices, such as sensors 90, are installed at a property, such as a dwelling. In one embodiment, sensors 90 may have been previously installed for other reasons (e.g., security cameras) and later re-configured to integrate with system 100 to provide different functionality. In another embodiment, sensors 90 are installed for at least the reason of integrating with and working with system 100. In still another embodiment, sensors 90 include a combination of pre-installed sensors 90 and newly-installed sensors 90.

Subsequently, information (also referred to herein as informatic data) is received from sensors 90 (step 3002). As discussed above, information may be transmitted from sensors 90 to dwelling computing device 300, and subsequently transmitted to management server 105 from the dwelling computing device 300. In another embodiment, dwelling computing device 300 is not installed onsite (e.g., dwelling computing device 300 and sensor 90 are not on a local area network) and sensors 90 communicate directly with management server 105. In yet another embodiment, dwelling computing device 300 is installed onsite, and sensors 90 communicate directly to management server 105, through the dwelling computing device 300, and/or a combination thereof.

Information captured from sensors 90 is analyzed by management server 105 (step 3003), such as by data analysis engine 120 and/or policy analysis engine 140 to determine a risk assessment value regarding a dwelling and/or other risk associated with the insured to which the captured informatic sensor data is relevant. In one embodiment, data analysis engine 120 analyzes the data and determines whether the received data (e.g., different categories) satisfy pre-determined thresholds. The predefined thresholds may be applicable to similarly situated structures or may be specific to a particular structure. In this embodiment, different thresholds are communicated to policy analysis engine 140, and the policy analysis engine 140 decides if any categories of data satisfies a pre-determined threshold.

In one embodiment, command generation engine 130 may send additional commands to sensors 90 and/or dwelling computing device 300 (step 3004), such as via the dwelling computing device 300 and/or directly to sensors 90. These commands may alter the types of measurements being performed, the frequency of measurements, the speed/frequency in which information is communicated from sensors 90, and/or any other settings. For example, the management server 105 may change the frequency of data capture for a sensor from one reading per day to one reading per hour. In another embodiment, the management server 105 may activate a sensor (from being completely inactive or dormant to an immediate reading of data or reading data based on a frequency of data capture determined by the management server 105). Subsequent to additional commands being sent to sensors 90, sensors 90 and/or dwelling computing device 300 execute and/or perform the additional commands and send additional information to management server 105 (step 3005). The additional information may be analyzed independent of the previously received information, and/or it may be analyzed and/or correlated with the previously received information (step 3006).

In one embodiment, information received by the management server 105 is immediately analyzed and then discarded. In another embodiment the information is analyzed and stored temporarily. For example, the management server 105 may transmit and store the captured data into an internal or an external database. The management server 105 may also utilize specific memory components (such as cache) for different types of data captured. The data may be temporarily stored in the cache, whereby the oldest data is deleted and newest data is added. The cache may store the data until the management server 105 determines whether to delete some or all of the cache data or move some or all of the data to a different memory. For example, as described below, the management server 105 may store data associated with calculating the dynamic threshold (e.g., thresholds for different categories) in a memory structure that offers faster retrieval (e.g., cache) and store other captured data (e.g., electricity voltage reading when the electricity voltage does not have an unexpected surge or decrease and does not indicate an electrical problem) in a conventional memory (e.g., conventional database, which may be internal or external and does not offer a faster data retrieval option). In yet another embodiment, the information is stored for later analysis. In addition, in still another embodiment, the information is stored via another device/module/engine. The management server 105 may then determine and update one or more data records associated with the structure in a database to reflect the determined conditions of the structure. In some embodiments, the management server 105 may only store a portion of the data captured. For example, the management server 105 may discard any captured data that is deemed "normal" (e.g., does not indicate a risk to the dwelling) and satisfies a time threshold (e.g., one year, one month, or any other pre-determined time threshold). Because the volume of data captured by multiple sensors may become very large, the management server 105 may utilize the above-mentioned methods to manage memory space and increase the efficiency of data collection, retrieval, and analysis.

Figure 4:
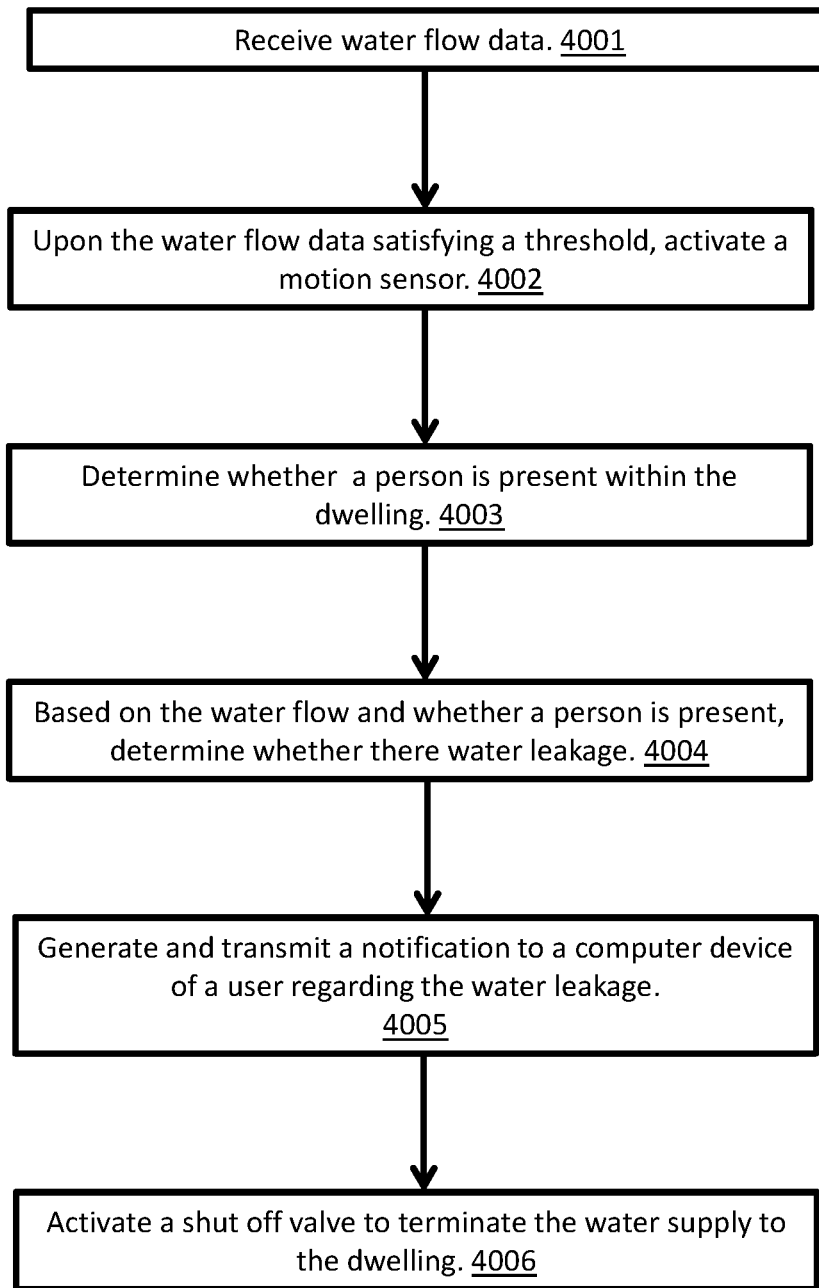
FIG. 4 is a flow diagram of operational steps for managing multiple sensors in accordance with an exemplary embodiment.

FIG. 4 illustrates a flow diagram of operational steps for managing multiple sensors in accordance with an exemplary embodiment. As described above, the managing server 105 may be in direct or indirect (via the dwelling computing device 300) contact with the sensors 90 installed within the dwelling. In an embodiment, an entity associated with the managing server 105 may provide a home sensor kit to a user associated with the dwelling. For example, the entity may provide the home sensor kit to a homeowner in exchange for a discount offered for a product associated with the dwelling. The home sensor kit may comprise a plurality of sensors as described above (e.g., sensor(s) 90). The homeowner may install the sensors in accordance with the instructions provided by the entity. The sensors may already be configured to communicate with the management server 105 (via a dwelling computing device or directly) upon installation or be later configured to be communicatively coupled with and part of the system architecture 100 described in FIG. 1A.

At step 4001, the management server 105 may receive water flow data. In this example, the data detects water flow, though it is intended that this system may be configured for electricity, gas, or the like. The management server 105 may receive the data via the dwelling computing device 300 or directly from a sensor installed at the structure. As described above, the data may be encrypted and/or aggregated, and the management server 105 may disaggregate and decrypt the data. In an embodiment, the management server 105 may receive data from a water flow sensor installed at a washing machine or near, on, or inside one or more water pipes feeding the washing machine. The data may indicate a water flow, which may correspond to a water leakage (e.g., higher than normal usage associated with the structure). In another embodiment, the water flow data may be received from a temperature sensor configured to monitor temperature changes associated with one or more pipes (e.g., heat displacement), which may indicate water flow.

The management server 105 may determine whether the water flow satisfies a threshold. For example, the management server may determine that a water flow that is above a threshold is a possible water leakage or flooding. The threshold may be pre-determined or calculated based on different attributes of the dwelling. For example, the water flow threshold may be calculated by the management server 105 based on a square footage of the structure, number of the people living in the structure, number of bathrooms, or the number of appliances that use water (e.g., dishwasher, water filter, or the like). In other embodiments, the water threshold may be received from a user associated with the dwelling (e.g., the homeowner may determine a water flow threshold that indicates water leakage). Furthermore, the threshold may be a dynamic threshold and change based on one or more factors, such as time or a number of inhabitants. For example, the water usage in the morning may be higher due to inhabitants taking showers, so a threshold for indicating a possible water leakage should be adjusted to account for this behavior. The dwelling computing device 300 (utilizing the inhabitant profile engine 140) may monitor water usage by the inhabitants and generate a water usage profile in a local or other an external database (e.g., database 346) that indicates the water usage within the dwelling. Based on the profile, the management server 105 may determine the water flow threshold for different time periods. In another embodiment, the dwelling computing device 300 may determine that the dwelling is vacant for a pre-determined period of time (e.g., motion sensor 90 does not detect any movements within the structure); and as a result, the dynamic threshold may be reduced.

At step 4002, upon the management server 105 detecting that the water flow data satisfies the water flow threshold, the management server 105 may activate a motion sensor. When the management server 105 detects that the water flow threshold is satisfied (e.g., the amount of water is higher than expected and a potential water leakage and/or flooding may be occurring), the management server 105 may activate one or more motion sensors and/or a camera within the dwelling. For example, if the water threshold at 11:00 AM is one gallon per minute (gpm) and the management server 105 detects a 10 gpm water flow, the management server 105 may generate and transmit an instruction to activate a motion sensor. The instruction (as described above) may alter a frequency of data capture by the motion sensor and command an immediate data capture. For example, the motion sensor may be configured to perform one reading per day (e.g., frequency of data capture is 1/d); by transmitting the instructions to the motion sensor, the management server 105 alters the frequency of data so that the motion sensor is now configured to collect data five times per day (e.g., 5/d). The instruction may also activate an otherwise dormant motion sensor and command the motion sensor to immediately start monitoring the structure and transmit the captured data. Transmitting the activation instruction signal to a dormant sensor (or a sensor with a low frequency of data capture) allows the sensors to function efficiently (e.g., the sensors are only capturing data when needed and not constantly monitoring motions within the structure; therefore they consume minimal energy and electricity). In some embodiments, a structure may have more than one motion sensor and the management server 105 may only activate some or all of the motion sensors. For example, the management server 105 may only activate a motion sensor in a laundry room and/or in the shower (or any other area associated with possible water use). In some other embodiments, the management server 105 may determine a location associated with the possible water leakage (e.g., based on the water pressure data received) and only activate the motion sensors with a respective field of vision that includes said location.

At step 4003, the management server 105 may determine the presence of a person within the dwelling. The motion sensor may use various methods, such as active and/or passive infrared technology to determine whether a person is present within the structure. The motion detectors may also alert the management server 105 as to a specific location where the presence of a person has been detected (laundry room, shower, or living room). The management server 105 may also use data captured by other sensors (other than the motion sensor) to determine the presence of multiple people within the dwelling. For example, a wireless router (e.g., wireless router 301 described in FIG. 1B) may communicate with the management server and notify the management server when a computing device is detected (e.g., a computing device connects to a wireless network associated with the dwelling, and the wireless router is configured to determine how many computing devices are connected at any given time). The management server 105 may use data received from the wireless router and (in conjunction with other data received from other sensors) may determine a number of people present within the dwelling.

At step 4004, based on the water flow and whether a person is present within the dwelling, the management server 105 may determine whether flooding or water leakage is occurring. The management server 105 may determine flooding based on the presence of a person within the dwelling (or the specific location of the person). For example, if the motion sensors do not detect presence of anyone within the structure after the water flow threshold has been satisfied, the management server 105 may determine that a water leakage or flooding has occurred. On the other hand, if the management server 105 detects that an inhabitant is taking a shower (e.g., the motion detector installed in the shower transmits data that indicates an inhabitant taking a shower) the management server 105 may determine that the sudden surge of water flow is attributed to an inhabitant taking shower. In another example, when the management server 105 detects a sudden surge of water, the management server 105 may generate and transmit an activation instruction to the a dishwasher (e.g., to cease a current operation or shut down) or other appliances that use water (e.g., washing machine) and receive an indication whether an appliance is in operation and consuming water; the management server 105 may determine that the sudden surge of water flow is attributed to the one or more appliances consuming water and not a water leakage.

In some embodiments, the management server 105 may modify the dynamic threshold based on the presence detected and determine whether the eater usage satisfies the second threshold (e.g., modified threshold). For example, the water threshold of 1 gpm may be modified to 5 gpm (based on pre-determined rules and thresholds) and if the water usage still satisfies the second threshold, the management server 150 may determine presence of water leakage or flooding (even though an inhabitant is taking a shower). The management server 105 may also alter a frequency of data capture for the water flow sensors and start monitoring the water flow more closely. If the water flow remains high (e.g., satisfying the water flow threshold) for longer than a pre-determined period of time, the management server 105 may then determine occurrence of flooding or water leakage. For example, if the management server 105 determines that the surge of water flow is due to an inhabitant taking a shower, the management server 105 may monitor the water flow closely and if the water flow remains high after a predetermined time period (e.g., 1 hour) the management server 105 may determine that the water flow surge is not attributed to the shower and is caused by a water leakage or flooding.

At step 4005, upon determining water leakage, the management server 105 may notify a computing device associated with the dwelling. For example, the management server 105 may determine a computing device or a user associated with the structure and may generate and transmit a notification informing the user that there may be flooding at the structure. The notification may be in form of a text, email, push notification, or the like. in some embodiments, the management server 105 may directly transmit a notification to an interactive communication platform, such as a chatbot or an interactive voice-controlled speaker devices. The management server 105 may allow further communication with the homeowner. The management server 105 may notify the homeowner of a possible water flow, then (using a chat server not shown in the figures) accept questions from the homeowner and provide specific details. Furthermore, the management server 105 may also notify a third party (e.g., a third party computing device such as a home security, maintenance service, and insurance company associated with the dwelling, or an emergency service). At step 4006, the management server 105 may also generate and transmit an instruction to activate a shut off valve and terminate the structure's water supply.

Figure 5:
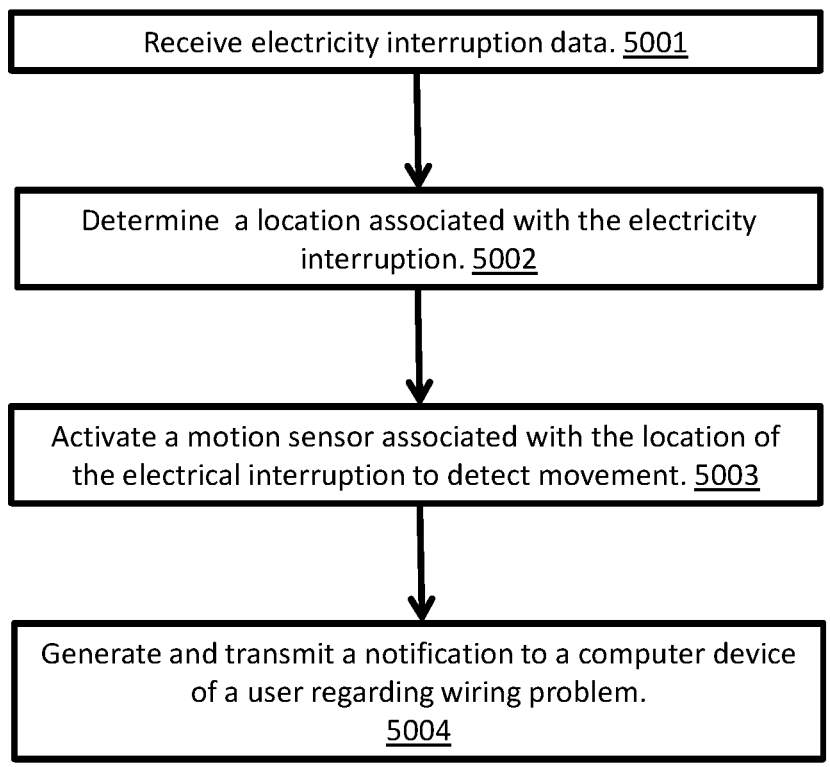
FIG. 5 is a flow diagram of operational steps for managing multiple sensors in accordance with an exemplary embodiment.

FIG. 5 illustrates a flow diagram of operational steps for managing multiple sensors in accordance with an exemplary embodiment. In the embodiment depicted in FIG. 5, the management server 105 manages multiple sensors (e.g., motion sensors, electronic system sensor, camera sensor) in order to determine electrical maintenance needs for a dwelling. At step 5001, the management server 105 may receive data indicating that an electrical interruption has occurred within the structure. In an embodiment, the management server 105 may receive a sudden and unexplained increase or decrease within the overall (or specific to a portion of the dwelling) voltage or current of the electrical system of the structure. For example, overall voltage value for a residential building within the United States is approximately 110 volts. The electrical sensor may detect the overall voltage and may determine that a voltage decrease of more than 10% (e.g., 11 volts) may be indicative of an electrical problem. The management server 105 may determine that the change in the voltage and/or current indicates an electrical interruption (e.g., a short circuit or a wiring problem). In some embodiment, the management server 105 may transmit an instruction to all the appliances within the structure and determine whether the spike in the voltage was caused by any of the appliances; if not, the management server 105 may determine that a wiring issue has caused the voltage interruption.

At step 5002, the management server 105 may first determine whether the interruption satisfies a pre-determined dynamic threshold (e.g., a threshold that changes based on the inhabitants habits and electricity usage as described above), and if the interruption satisfies the dynamic threshold, the management server 105 may determine a location associated with the electricity interruption. As described above, the pre-determined dynamic threshold may change throughout the day (e.g., different thresholds at different times), may be customized based on the inhabitants' electricity usage, or may be modified by the management server 105 based on a detected number of inhabitants or presence of people within the dwelling. For example, if the motion sensor and/or the wireless router detect an unusually high number of people within the dwelling (e.g., 15 people have connected to a wireless network associated with the dwelling), the management server 105 may increase the dynamic threshold by a pre-determined amount. The management server 105 may determine that the interruption is associated with the attic. Upon making this determination, the management server 105 may activate a motion sensor and/or a camera sensor associated with the location. As described above, the management server 105 may generate instructions and command an immediate reading (e.g., data capture) and alter the frequency of reading by the motion sensor. The management server 105 may also command the camera sensor to record all the activities within the determined location.

At step 5003, the management server 105 may analyze the data received from the motion sensors and may determine presence of motion where the motion is generally not expected. For example, the presence of motion in the attic in conjunction with possible wiring issues may indicate that rodents may have caused wiring issues. Furthermore, the footage captured by the camera may be stored in a local (or external) database. The management server 105 may also transmit the footage to a third party analyst to further determine whether rodents have caused the wiring issues. The management server 105 may also notify a computing device associated with the dwelling. For example, the management server 105 may identify a computing device or a user associated with the structure and may generate and transmit a notification informing the user that the house may have wiring problems and recommend maintenance of the wiring in the attic. The notification may be in form of a text, email, push notification, or the like; and may include a hyperlink directing the homeowner to the footage of the attic (or the determined location of the wiring problem). Furthermore, the management server 105 may also notify a third party (e.g., a third party computing device such as a home security, maintenance service, pest control, insurance company, or an emergency service).

The term "module"/"engine" is used herein to denote a functional operation that may be embodied either as a stand-alone component or as an integrated configuration of a plurality of subordinate components. Thus, "modules"/"engines" may be implemented as a single module or as a plurality of modules that operate in cooperation with one another. Moreover, although "modules"/"engines" may be described herein as being implemented as software, they could be implemented in any of hardware (e.g. electronic circuitry), firmware, software, or a combination thereof.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A computer system for processing environment condition data, comprising:
   a plurality of electronic sensors, configured to collect environment condition data corresponding to an environment;
   a processor in communication with the plurality of electronic sensors, wherein the processor is configured to:
      identify, via a first sensor of the plurality of electronic sensors, environmental changes to the environment;
      in response to identifying the environmental changes, generate a sensor control instruction requesting to increase a data capture frequency of at least one of the plurality of electronic sensors;
      transmit the sensor control instruction to the at least one of the plurality of electronic sensors to modify a frequency of data capture by the at least one of the plurality of electronic sensors;
      in response to transmitting the sensor control instruction, receive environmental condition data corresponding to the data capture frequency, from the at least one of the plurality of electronic sensors;
      identify an operational parameter threshold based upon inhabitant habits within the environment; and
      upon the environmental condition data corresponding to the data capture frequency breaching the operational parameter threshold, transmit an electronic notification to an electronic device indicative of a breach of the operational parameter threshold.

2. The computer system of claim 1, wherein the operational parameter threshold is based on a habit profile associated with inhabitants of the environment.

3. The computer system of claim 2, wherein the habit profile is generated based on continuously monitored environment condition data.

4. The computer system of claim 3, wherein the operational parameter threshold is based on a historical trend of the continuously monitored environment condition data.

5. The computer system of claim 1, wherein:
   the habit relates to water usage at a particular time period; and
   the operational parameter threshold is associated with a threshold amount of water usage monitored by a water sensor.

6. The computer system of claim 5, wherein the processor is configured to:
   generate a message indicating a possible water leakage when the operational parameter threshold is breached; and
   transmit the message to a computing device associated with the environment.

7. The computer system of claim 5, wherein the processor is configured to:
   identify, from one or more of the plurality of electronic sensors, observable current water usage by inhabitants; and
   modify the operational parameter threshold based upon the observable current water usage.

8. The computer system of claim 1, wherein:
   the habit relates to electricity usage at a particular time period; and
   the operational parameter threshold is associated with a threshold amount of electricity usage monitored by an electricity sensor.

9. The computer system of claim 8, wherein the processor is configured to:
   generate a message indicating a possible electrical issue when the operational parameter threshold is breached; and
   transmit the message to a computing device associated with the environment.

10. The computer system of claim 5, wherein the processor is configured to:
    identify, from one or more of the plurality of electronic sensors, observable current electrical usage by inhabitants; and
    modify the operational parameter threshold based upon the observable current electrical usage.

11. The computer system of claim 1, wherein the processor is configured to:
    identify a number of inhabitants; and
    identify the operational parameter threshold based upon the number of the inhabitants.

12. A tangible, non-transitory, computer-readable medium, comprising computer-readable instructions that, when executed by one or more processors of a computer, cause the computer to:
    identify, via a first sensor of a plurality of electronic sensors configured to collect environment condition data corresponding to an environment, environmental changes to the environment;
    in response to identifying the environmental changes, generate a sensor control instruction requesting to increase a data capture frequency of at least one of the plurality of electronic sensors;
    transmit the sensor control instruction to the at least one of the plurality of electronic sensors to modify a frequency of data capture by the at least one of the plurality of electronic sensors;
    in response to transmitting the sensor control instruction, receive environmental condition data corresponding to the data capture frequency, from the at least one of the plurality of electronic sensors;
    identify an operational parameter threshold based upon inhabitant habits within the environment; and
    upon the environmental condition data corresponding to the data capture frequency breaching the operational parameter threshold, transmit an electronic notification to an electronic device indicative of a breach of the operational parameter threshold.

13. The computer-readable medium of claim 12, wherein the operational parameter threshold is based on a historical trend of continuously monitored environment condition data, indicating a trend of use at particular time periods.

14. The computer-readable medium of claim 12, wherein:
    the habit relates to water usage at a particular time period; and
    the operational parameter threshold is associated with a threshold amount of water usage monitored by a water sensor.

15. The computer-readable medium of claim 14, comprising computer-readable instructions that, when executed by the one or more processors, cause the one or more processors to:
generate a message indicating a possible water leakage when the operational parameter threshold is breached; and
transmit the message to a computing device associated with the environment.

16. The computer-readable medium of claim 14, comprising computer-readable instructions that, when executed by the one or more processors, cause the one or more processors to:
identify, from one or more of the plurality of electronic sensors, observable current water usage by inhabitants; and
modify the operational parameter threshold based upon the observable current water usage.

17. The computer-readable medium of claim 12, wherein:
the habit relates to electricity usage at a particular time period; and
the operational parameter threshold is associated with a threshold amount of electricity usage monitored by an electricity sensor.

18. The computer-readable medium of claim 17, comprising computer-readable instructions that, when executed by the one or more processors, cause the one or more processors to:
generate a message indicating a possible electrical issue when the operational parameter threshold is breached; and
transmit the message to a computing device associated with the environment.

19. The computer-readable medium of claim 17, comprising computer-readable instructions that, when executed by the one or more processors, cause the one or more processors to:
identify, from one or more of the plurality of electronic sensors, observable current electrical usage by inhabitants; and
modify the operational parameter threshold based upon the observable current electrical usage.

20. A method, comprising:
identifying, via a first sensor of a plurality of electronic sensors configured to collect environment condition data corresponding to an environment, environmental changes to the environment;
in response to identifying the environmental changes, generating a sensor control instruction requesting to increase a data capture frequency of at least one of the plurality of electronic sensors;
transmitting the sensor control instruction to the at least one of the plurality of electronic sensors to modify a frequency of data capture by the at least one of the plurality of electronic sensors;
in response to transmitting the sensor control instruction, receive environmental condition data corresponding to the data capture frequency, from the at least one of the plurality of electronic sensors;
identifying an operational parameter threshold based upon inhabitant habits within the environment; and
upon the environmental condition data corresponding to the data capture frequency breaching the operational parameter threshold, transmitting an electronic notification to an electronic device indicative of a breach of the operational parameter threshold.

* * * * *